(12) United States Patent
Kiczenski et al.

(10) Patent No.: US 12,202,768 B2
(45) Date of Patent: Jan. 21, 2025

(54) PHOTOCHROMIC GLASS AND PHOTOCHROMIC GLASS WINDOWS

(71) Applicant: CORNING INCORPORATED, Corning, NY (US)

(72) Inventors: Timothy James Kiczenski, Corning, NY (US); Nadja Teresia Lönnroth, Helsinki (FI)

(73) Assignee: CORNING INCORPORATED, Corning, NY (US)

( * ) Notice: Subject to any disclaimer, the term of this patent is extended or adjusted under 35 U.S.C. 154(b) by 856 days.

(21) Appl. No.: 17/423,169

(22) PCT Filed: Jan. 13, 2020

(86) PCT No.: PCT/US2020/013275
§ 371 (c)(1),
(2) Date: Jul. 15, 2021

(87) PCT Pub. No.: WO2020/150120
PCT Pub. Date: Jul. 23, 2020

(65) Prior Publication Data
US 2022/0127184 A1 Apr. 28, 2022

Related U.S. Application Data

(60) Provisional application No. 62/794,238, filed on Jan. 18, 2019.

(51) Int. Cl.
C03C 4/06 (2006.01)
C03C 3/097 (2006.01)
C03C 3/11 (2006.01)

(52) U.S. Cl.
CPC ............... *C03C 4/06* (2013.01); *C03C 3/11* (2013.01)

(58) Field of Classification Search
CPC .............. C03C 3/097; C03C 3/11; C03C 4/06
See application file for complete search history.

(56) References Cited

U.S. PATENT DOCUMENTS 4,018,965 A 4/1977 Kerko et al.
4,168,339 A 9/1979 Kerko et al.
(Continued)

FOREIGN PATENT DOCUMENTS

CN 1262505 C 7/2006
CN 102464449 A 5/2012
(Continued)

OTHER PUBLICATIONS

International Search Report and Written Opinion of the International Searching Authority; PCT/US2020/013275; dated Apr. 28, 2020; 9 pages; European Patent Office.

*Primary Examiner* — Matthew E. Hoban
(74) *Attorney, Agent, or Firm* — Svetlana Z. Short

(57) ABSTRACT

A photochromic glass, comprising: (i) a glass matrix that, comprising in mol percent (mol %) based on oxides: 66 mol %≤$SiO_2$≤75 mol %; 8 mol %≤$B_2O_3$≤13 mol %; mol %≤$Al_2O_3$≤7 mol %; 1.5 mol %≤$P_2O_5$≤6 mol %, mol %≤$Na_2O$≤5.5 mol %; 3 mol %≤$K_2O$≤9.5 mol %; 0 mol %≤MgO≤4 mol %; 0 mol %≤$Li_2O$≤0.05 mol %; 0 mol %≤BaO≤0.05 mol %; 0 mol %≤CaO≤0.05 mole %; wherein the amount of ($Li_2O$+BO+CaO≤0.1 mole %); and (ii)) a plurality of photochromic agents, comprising in mol percent (%) with respect to the glass matrix: 0.07%≤Ag≤0.15%; 0.14%≤Cl≤0.25%; 0.025%≤Br≤0.04%; 0.0065%≤CuO≤0.015%, and wherein CuO/Ag≤0.22.

33 Claims, 11 Drawing Sheets

(56) References Cited

U.S. PATENT DOCUMENTS

| | | | |
|---|---|---|---|
| 4,190,451 A | * | 2/1980 | Hares .................. C03C 4/06 |
| | | | 501/59 |
| 4,550,087 A | | 10/1985 | Kerko et al. |
| 4,608,349 A | | 8/1986 | Kerko et al. |
| 4,746,633 A | | 5/1988 | Mazeau et al. |
| 4,757,034 A | | 7/1988 | Prassas |
| 5,300,465 A | | 4/1994 | Grateau et al. |
| 6,162,749 A | | 12/2000 | Brocheton et al. |
| 6,165,922 A | | 12/2000 | Havens et al. |
| 6,177,371 B1 | | 1/2001 | Havens et al. |
| 6,711,917 B2 | | 3/2004 | Landa et al. |
| 6,887,808 B2 | | 5/2005 | Hasui |
| 8,179,595 B2 | | 5/2012 | Borrelli et al. |
| 8,534,095 B2 | | 9/2013 | Borrelli et al. |
| 9,145,330 B2 | | 9/2015 | Brocheton |
| 10,150,692 B2 | | 12/2018 | Araujo et al. |
| 2003/0044102 A1 | | 3/2003 | Hasui et al. |
| 2015/0099130 A1 | | 4/2015 | Mauro et al. |
| 2017/0075049 A1 | | 3/2017 | Borrelli et al. |
| 2018/0246263 A1 | | 8/2018 | Lim |

FOREIGN PATENT DOCUMENTS

| | | |
|---|---|---|
| CN | 208151221 U | 11/2018 |
| EP | 1015394 B1 | 6/2008 |
| GB | 1495125 A | 12/1977 |
| GB | 2027422 A | 2/1980 |
| RU | 2062756 C1 | 6/1996 |

* cited by examiner

PHOTOCHROMIC GLASS AND PHOTOCHROMIC GLASS WINDOWS

CROSS-REFERENCE TO RELATED APPLICATION

This application claims the benefit of priority under 35 U.S.C. § 371 of International Application No. PCT/US2020/013275, filed on Jan. 13, 2020, which claims the benefit of priority under 35 U.S.C. § 120 of U.S. Application Ser. No. 62/794,238 filed on Jan. 18, 2019, the content of which is relied upon and incorporated herein by reference in its entirety.

BACKGROUND

Field

The present disclosure relates generally to photochromic glass, and photochromic multi-pane window assemblies, and to structures incorporating such window assemblies. The present disclosure also relates to photochromic multi-pane window assemblies comprising and one or more low emissivity layers incorporated therein and photochromic glass.

Technical Background

Photochromic glasses are typically used in sunglass applications and were usually manufactured by mold pressing molten glass to form a solid glass preform, which was then polished to the required shape. By this method, it was possible to manufacture prescription-type glasses, whose different shapes were needed to get the required optical correction. Photochromic glass compositions used in mold pressing manufacturing processes to make sun glasses have very little constraints to the glass viscosity or liquidus temperature, because the glass molding process utilizes a fast quench of the melted glass when forming the glass preform. These type of photochromic glass compositions typically included lead oxide.

Some photochromic glass sheets were also manufactured by fusion draw process. Such glass compositions are described, for example in U.S. Pat. Nos. 4,018,965 and 4,358,542. Corning Incorporated via a relatively low temperature glass. These glasses exhibit viscosity of about 35 kP of about 900° C., viscosity at about 200 P (200 Pascals) at the temperatures of about of about 1395° C. and softening point of about 655° C. It is heat treated at a heat treatment temperature of about 630° C., i.e., when viscosity of the glass is around $1.0 \times 10^8$ P.

Sunglasses manufactured from glass sheets made by such a process were cut to strips and sagged on ring molds in order to get the curvature needed for the lenses, while the sagged surfaces retained the good surface quality of fusion drawn glass. However, heat treatment temperature required for formation of Ag-halide particles that cause photo chromaticity in the photochromic glass compositions described in U.S. Pat. Nos. 4,018,965 and 4,358,542 is around 630° C. (i.e., at viscosities of about $1.0 \times 10^8$ poise), which is very close to the softening point of these glasses (about 655° C.). That is, the difference between the softening points and the heat treatment temperatures of these glasses is only about 35° C. Such a small temperature difference between the softening points and the heat treatment temperatures is not a problem with sunglasses because during the heat treatment the glass was simultaneously sagged to a curved lens shape.

However, for glass windows one needs a smooth flat surface. Heat treatment of glass sheets made from the glass compositions described in U.S. Pat. Nos. 4,018,965 and 4,358,542 sheets is performed on setters (setters support the glass inside the furnace), and these setters leave imprints on the glass sheets, requiring subsequent polishing of glass sheets. This subsequent polishing is time consuming and relatively expensive.

Conventional architectural windows are comprised of flat double-pane and triple-pane glass units. That is, these units have two or three spatially separated flat glass sheet panes used to insulate the temperature inside a structure from the outdoor temperature. Without effective filtration of electromagnetic radiation transmittance therethrough, however, conventional windows may lack an element needed to more effectively insulate structures and to control light transmitted into structures.

There has been increasing interest in smart windows that result in lower energy consumption while making the interior lightning condition more pleasant. Consumers often prefer larger windows in both residential and office buildings. With increased window area, the main means to reduce extensive glare indoors has been curtains and shades, with new technologies as electrochromic and thermochromic windows trying to get into the market. Both of these technologies are rather expensive and require special installing, wiring and maintenance. A photochromic glass could essentially give needed glare reduction, with no maintenance and special installation. However, large glass windows need to have good surface quality and as described above, polishing such windows is very time consuming and expensive.

Glass sheets for display applications, such as Eagle XG® glass sheets, have high softening temperatures, and can be manufactured via high temperature glass fusion draw method, which utilizes high glass flow and results in superior surface quality. However, the photochromic glass compositions suitable for the mold pressing method are not suitable for manufacture of photochromic glass sheets via the high temperature fusion draw method.

The modern glass fusion draw process is performed at very high temperatures (e.g., glass delivery temperatures to the isopipe of greater than 1200° C.), and the zirconia isopipe ceramic that supports flowing glass forming glass sheet during the glass-fusion process equipment cannot relax thermal stresses at temperatures below 1100° C. Typical photochromic glass compositions, including glass compositions described in U.S. Pat. Nos. 4,018,965 and 4,358,542 are formed at much lower temperatures, and thus believed not to be suitable for making glass sheets via presently used high temperature glass-fusion manufacturing methods.

Accordingly, a need exists for high temperature fusion-draw formable sheets of photochromic glass that can be used in windows, with the resultant glass capable of having at least equal photochromic behavior to that of older photochromic glass compositions. Also, a need exists for a multi-pane windows that are capable of further limiting solar heat gain and adjusting visible light transmissivity.

SUMMARY

According to some embodiments a photochromic glass, comprises:
(i) a glass matrix that, comprising in mol percent (mol %) based on oxides:
66 mol % ≤ $SiO_2$ ≤ 75 mol %;
8 mol % ≤ $B_2O_3$ ≤ 13 mol %;

3.5 mol % ≤ $Al_2O_3$ ≤ 7 mol %;
1.5 mol % ≤ $P_2O_5$ ≤ 6 mol %,
3.6 mol % ≤ $Na_2O$ ≤ 5.5 mol %;
3 mol % ≤ $K_2O$ ≤ 9.5 mol %;
0 mol % ≤ MgO ≤ 4 mol %;
0 mol % ≤ $Li_2O$ ≤ 0.05 mol %; 0 mol % ≤ BaO ≤ 0.05 mol %; 0 mol % ≤ CaO ≤ 0.05 mole %; wherein the amount of ($Li_2O$+BO+CaO ≤ 0.1 mole %); and (ii) a plurality of photochromic agents, comprising in mol percent (%) with respect to the glass matrix:
0.07% ≤ Ag ≤ 0.15%;
0.14% ≤ Cl ≤ 0.25%;
0.025% ≤ Br ≤ 0.04%;
0.0065% ≤ CuO ≤ 0.015%, and
wherein CuO/Ag ≤ 0.22.

Preferably 0 mol % ≤ $Li_2O$ ≤ 0.01 mol %; 0 mol % ≤ BaO ≤ 0.01 mol %; 0 mol % ≤ CaO ≤ 0.01 mole %; wherein the amount of ($Li_2O$+BO+CaO ≤ 0.025 mole %. comprising essentially no $Li_2O$, CaO, or BaO. Preferably, the glass matrix is substantially free of rare earth elements, $Li_2O$, CaO, and BaO.

Preferably, according to the embodiments described herein, CuO/Ag ≤ 0.20 and in some embodiments CuO/Ag ≤ 0.18.

According to some embodiments the photochromic glass exhibits at least one of the following properties:
(i) a transmission in the clear state $T_0$ > 85% (preferably 90% or higher);
(ii) transmission in the darkened state after a 15 minute exposure at 22° C. ($T_{d15-22C}$) < 35%;
(iii) transmission in the darkened state after a 15 minute exposure at 35° C. ($T_{d15-35C}$) < 45%; or
(iv) fast fading characterized by a transmission $T_{f5}$ (minutes after UV extinction) > 45%, and in some embodiments > 55%.

According to some embodiments the photochromic glass exhibits at least one of the following properties:
(i) a transmission in the clear state $T_0$ > 85% (preferably 90% or higher);
(ii) transmission in the darkened state after an 8 minute exposure at 22° C. ($T_{d8-22C}$) < 35%;
(iii) transmission in the darkened state after a 15 minute exposure at 35° C. ($T_{d15-35C}$) < 45%; or
(iv) fast fading characterized by a transmission $T_{f5}$ (5 minutes after UV extinction) > 45%, and in some embodiments > 55%.

According to some embodiments, the photochromic has a heat treatment temperature $T_h$, and a softening point $T_s$, such that the difference between $T_s-T_h$ > 50° C. In some embodiments $T_s-T_h$ > 65° C., in some embodiments 150° C. > $T_s-T_h$ > 65° C., and in some embodiments 225° C. > $T_s-T_h$ > 65° C.

According to embodiments of the present disclosure a multi-pane window comprises a photochromic glass and a low emissivity layer. The low emissivity layer reflects and/or absorbs infrared wavelengths and transmits ultraviolet and visible wavelengths to darken the photochromic glass and vary visible light transmittance into the structure.

According to embodiments of the present disclosure, a window is provided comprising an outside glass pane and an inside glass pane. In embodiments, the outside glass pane includes a low emissivity layer. In embodiments, the inside glass pane comprises a photochromic glass. In embodiments, the inside glass pane is spaced apart from the outside glass pane. In embodiments, the low emissivity layer transmits solar radiation in an activation band to activate the photochromic glass and reduce visible light transmittance through the photochromic glass.

According to embodiments of the present disclosure, a window including an outside glass pane and an inside glass pane. In embodiments, the outside glass pane comprises a low emissivity layer. In embodiments, the inside glass comprises a photochromic glass. In embodiments, the inside glass pane is spaced apart from the outside glass pane. In embodiments, the low emissivity layer transmits solar radiation in an activation band of the photochromic glass which reduces visible light transmittance through the contacted photochromic glass.

According to embodiments of the present disclosure, a building including an opening with a window therein is disclosed. In embodiments, the window includes an external glass pane and an internal glass pane. In embodiments, the external glass pane comprises a low emissivity layer. In embodiments, the internal glass comprises a photochromic glass. In embodiments, the internal glass pane is spaced apart from the external glass pane. In embodiments, the low emissivity layer transmits an activation wavelength of the photochromic glass which reduces visible light transmittance through the contacted photochromic glass.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

BRIEF DESCRIPTION OF THE DRAWINGS

The disclosure will be better understood, and features, aspects and advantages other than those set forth above will become apparent when consideration is given to the following detailed description thereof. Such detailed description makes reference to the following drawings, wherein:

FIG. 2 also illustrates that photochromic glasses darken when exposed to light in a wavelength range (activation band) between 320 nm and 420 nm.

DETAILED DESCRIPTION

Figure 1:
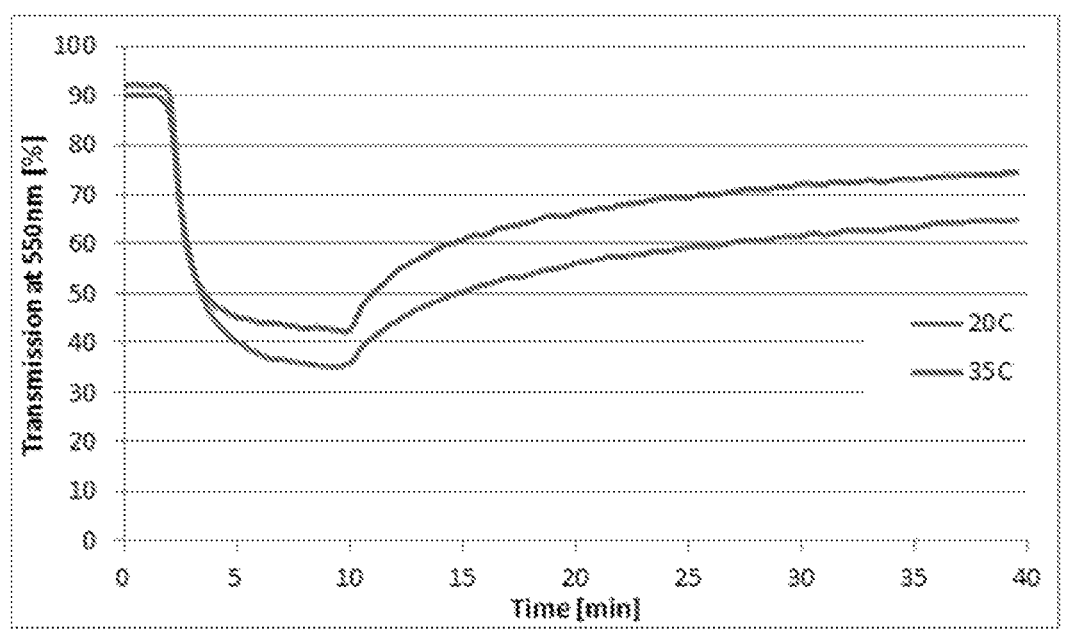
FIG. 1 is a plot of light transmittance (%) vs. time (minutes) for two tests of a 1.6 mm thick embodiments of photochromic glass panes, at two different temperatures

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the exemplary methods and materials are described below.

Conventional multi-pane windows may have a number of shortcomings. One potential shortcoming may be the transmittance of infrared (IR) and near infrared (NIR) solar light wavelengths into the structure which causes heat gain therein. Another potential shortcoming may be the inability to reduce visible light transmittance over time into the structure independent of the outdoor temperature, but instead dependent upon interaction with specific light wavelengths from outside.

Conventional multi-pane windows have sometimes included low emissivity layers on their glass panes to limit transmittance of different combinations of solar light wavelengths into the structure. Low emissivity layers may reflect and/or absorb infrared (IR) and near infrared (NIR) wavelengths from the solar electromagnetic spectrum. In some cases, reflection of IR and NIR wavelengths may be ≥90% of those in the solar spectrum, or even ≥95%. Absorption of IR and NIR wavelengths by low emissivity layers may be ≤5% of those included in the solar spectrum, or even less ≤1%. Thus, low emissivity layers may reduce solar heat gain across the window into the structure. Conventional low emissivity layers may also reflect and/or absorb visible light and ultraviolet (UV) wavelengths. The reflection of visible light by conventional low emissivity layers may cause distortion of outdoor colors as seen from indoors (e.g., a blue sky viewed through the low emissivity layer may appear grey or green). The fraction of wavelengths absorbed by the low emissivity layer sometimes generates heat on the glass pane which the low emissivity layer exists. Conventional windows including low emissivity layers are not able to reduce visible light transmittance into the structure over time depending on interaction with specific light wavelengths from outside. Instead, low emissivity layers transmit a constant fraction of visible light from the solar spectrum.

Conventional multi-pane windows have also sometimes included photochromic organic polymer films on glass panes in windows to reduce transmittance of visible light through the window. These solutions may have limitations in that organic polymer films either degrade or lose their photochromic function before the expiration of the window lifetime. For example, some photochromic organic polymer films degrade after 5 years whereas a multi-pane window sometimes has a useful lifetime of around 30 years. Accordingly, photochromic organic polymer films from conventional multi-pane windows are not in accordance with the present disclosure. That is, photochromic glass of the present disclosure does not include organic polymer films or organic polymer films on glass panes.

Other conventional windows have sometimes included photochromic glass materials as the outside pane of a window in an attempt to reduce transmittance of visible light through the window depending on solar light intensity. That is, conventional windows have attempted to use photochromic glass properties (i.e., photochromism or darkening) to reduce the fraction of visible light transmittance during times of high solar light intensity (e.g., sunny days, ≥100,000 lux, etc.) and maximize visible light transmittance during times of low solar light intensity (e.g., overcast, night, ≤25,000 lux, etc.). Again, however, conventional windows have included the photochromic glass on the pane exposed to the outside elements. Notably, conventional windows including photochromic glass on the outside pane have failed to effectively change or vary visible light transmittance through the window in response to interaction with specific light wavelengths from solar radiation. After all, the photochromic effect (sometimes called darkening) of photochromic glass is also responsive to temperatures changes. Specifically, higher temperatures (e.g., >26° C.) may lessen a photochromic glass' ability to darken (and thereby reduce visible light transmittance). Also, lower temperatures (e.g., <20° C., or even <15° C.) may slow the reversal of the photochromic effect in photochromic glass (i.e., the glass stays in a darkened state for a longer time). Thus, a photochromic glass pane immediately adjacent to and exposed to outside temperatures may have problems.

FIG. 1 illustrates transmittance behavior of a photochromic glass sheet embodiment that can be utilized as a window pane. This figure shows that the change in visible light transmittance through the photochromic glass exposed to solar light may be dependent, in part, on the temperature of the photochromic glass. For example, FIG. 1 illustrates that the reversal rate of the photochromic effect when removed from solar light may depend on the temperature of the photochromic glass.

More specifically, FIG. 1 provides a plot of light transmittance (%) vs. time (minutes) at 550 nm wavelength for a 1.6 mm thick photochromic glass exposed to a black light blue (BLB) light source at two different temperatures. (Similar results were also obtained when this glass was measured after exposure to a solar simulator). In both tests, the same photosensitive glass pane has an original visible light transmissivity of about 90%. In the first test, indicated by line 450, the glass pane was kept at about 20° C. After being measured in the clear state for 2 minutes (which corresponds to transmissivity (also referred to as transmittance herein) T of about 90% for this glass embodiment), BLB light was turned on at time designated as t0 (indicated by point 449 in both tests). After additional 8 minutes (indicated by point 451), the photochromic effect (darkening) of this glass embodiment reduced the fraction of visible light transmissivity through the glass to about 35%. At point 451, the BLB light was turned OFF (deactivating further darkening of the photochromic glass) which increased, after 5 minutes, visible light transmissivity (at 550 nm) through the photochromic glass to about 50. In the second test, indicated by line 452, the photochromic glass pane was kept at 35° C. After 8 minutes (indicated by point 453), the darkening of the glass had reduced the fraction of visible light transmissivity through the glass to about 42%. At point 453, the BLB light was turned OFF which increased visible light transmissivity through the photochromic glass to about 60% after 5 minutes and to about 68% and after 10 minutes.

The present disclosure is directed to photochromic glass compositions that advantageously have viscosity of about 35 kP (35 kPascals) in 1050° C.-1215° C. temperature range (i.e., 1050° C.≤T(35 kP)≤1215° C.), and viscosity at about 200 P (200 Pascals) at the temperatures of about 1600° C.-1730° C. (i.e., 1600° C.≤T(200 P)≤1730° C.), and thus they are compatible with high temperature fusion draw processes, thus enabling manufacturing of photochromic sheet glass on existing high temperature fusion equipment. It is noted that a viscosity of about 35 kP (35 kPascals) in 1050° C.-1215° C. temperature range is the viscosity of the glass that is delivered to the isopipe, and that this temperature range is advantageously compatible with the temperatures required by the high temperature glass fusion process. The glass embodiments described herein advantageously have relatively large differences between softening point and heat treatment temperatures. It is better that the heat treatment temperature $T_h$ not be close to the softening point temperature Ts of the glass, in order to minimize deformation of the glass sheet, and to increase its surface quality. In the embodiments described herein $T_s-T_h>50°$ C., and preferably $\geq 65°$ C. For example, in some embodiments $225°$ C.$\geq T_s-T_h \geq 60°$ C., $225°$ C.$\geq T_s-T_h \geq 65°$ C., or $200°$ C.$\geq T_s-T_h \geq 65°$ C., or $175°$ C.$\geq T_s-T_h \geq 65°$ C., or $150°$ C.$\geq T_s-T_h \geq 65°$ C. (Ts corresponds to viscosity of about $10^{7.6}$ Poise).

For the heat treatment temperature $T_s$ of the glass, it is better that the temperature $T_s$ be farther away from softening point of the glass, then the less deforming of the sheet will happen. The embodiments of the glasses disclosed herein can be heat treated, for example, in the 655-695° C. range, while their softening points are, for example, from about 755° C. and up to 890-880° C. The heat treatment viscosities of the glass embodiments disclosed herein are from about $1.37 \times 10^9$ P (i.e., $1.37 \times 10^9$ Poise) to about $3.54 \times 10^{11}$ P. The embodiments of the glass compositions described herein advantageously exhibit liquidus temperatures below 900° C., and thus liquidus viscosity that allows sheet forming in the range of 0.5 M Poise to 5 M Poise. These glass compositions can be utilized to form sheets of glass by a high temperature glass fusion processes, advantageously forming glass sheets that can be used in windows, and that have flat, defect free surface without having to be polished after the glass fusion manufacturing process.

The photochromic glass compositions of the glasses embodiments described herein comprise $SiO_2$, $Al_2O_3$, $B_2O_3$, $P_2O_5$, $Na_2O$ and $K_2O$. The glass composition may include MgO. The photochromic glass composition comprises a photochromic package that includes a plurality of photochromic agents or components, for example Ag, Cl, CuO and Br.

More specifically the embodiments of the photochromic glass composition include $P_2O_5$, as well as at least 66 mol % of $SiO_2$, and not greater than 13 mol % of $B_2O_3$, which increases glass viscosity, while allowing formation of AgCl crystals during heat treatment (at temperatures $T_h$). The embodiments of the glass compositions described herein advantageously exhibit liquidus temperatures below 900° C., and thus liquidus viscosity that allows sheet forming.

At least some of the embodiments of the photochromic glasses described herein darken to <30% transmission (at 550 nm) with light intensities that are comparable to those produced by the sun light. By adjusting the photochromic package composition, the same base glass composition can be utilized to perform with a variety of darkening and fading characteristics.

According to some embodiments the photochromic glasses described herein comprise:
  a glass matrix that, comprising in mol percent (mol %) based on oxides:
    66 mol %$\leq SiO_2 \leq$75 mol %;
    8 mol %$\leq B_2O_3 \leq$13 mol %;
    3.7 mol %$\leq Al_2O_3 \leq$7 mol %;
    1.5 mol %$\leq P_2O_5 \leq$6 mol %,
    3.8 mol %$\leq Na_2O \leq$5.5 mol %;
    3 mol %$\leq K_2O \leq$9.5 mol %;
    0 mol %$\leq MgO \leq$4 mol %;
    and
  a plurality of photochromic agents, comprising in mol percent (%) with respect to the glass matrix:
    0.07%$\leq Ag \leq$0.15%;
    0.14%$\leq Cl \leq$0.25%;
    0.025%$\leq Br \leq$0.04%;
    0.0065%$\leq CuO \leq$0.015%, and
    wherein CuO/Ag$\leq$0.22.

In some embodiments CuO/Ag$\leq$0.20, and in some embodiments CuO/Ag$\leq$0.20.

The embodiments of the glass described herein comprise 0 mol %$\leq Li_2O \leq$0.05 mol %; 0 mol %$\leq BaO \leq$0.05 mol %; 0 mol %$\leq CaO \leq$0.05 mol %; such that the total amount of $Li_2O+BO+CaO$ is not greater than 0.1 mol %. Preferably the photochromic glass has essentially no $Li_2O$, BO, or CaO. According to at least some embodiments the glass compositions may comprise only trace amounts of other components. Preferably no PbO is present in the glass. However, the glass composition may contain some titania (e.g., 0 to 2.5 mol %).

More specifically, we discovered that the use of $Li_2O$ as a modifier in phosphorus containing photochromic glasses described herein promotes crystallization of $Li_3PO_4$. Accordingly, the use of $Li_2O$ in the embodiments of the glass disclosed herein is not preferable and its use as a modifier preferably be avoided. Furthermore, we discovered that the use of a CaO modifier in phosphorus containing photochromic glasses described herein brings out calcium phosphate phases, and the use of while BaO additions precipitate $Ba_5(PO_4)_3Cl$ phase. $Li_2O$, CaO and Ba also undesirably change the liquidus temperature of the glass compositions to very high temperatures, leading to crystallization upon cooling of the glass melt. Thus, according to the embodiments described herein, the use of $Li_2O$, CaO, and BaO should be minimized. We also discovered that MgO is the only alkaline earth that has can used successfully in the glass embodiments without undesirable effects, and thus MgO was utilized in several embodiments of the photochromic glass compositions described herein.

Photochromic glasses darken when exposed to light in a wavelength range (activation band $\alpha$) situated between 320 nm and 400 nm. Some photochromic glasses darken when exposed to light in the activation band $\alpha$ situated between about 320 nm and about 420 nm, or between about 350 and about 420 nm wavelengths.

Figure 2:
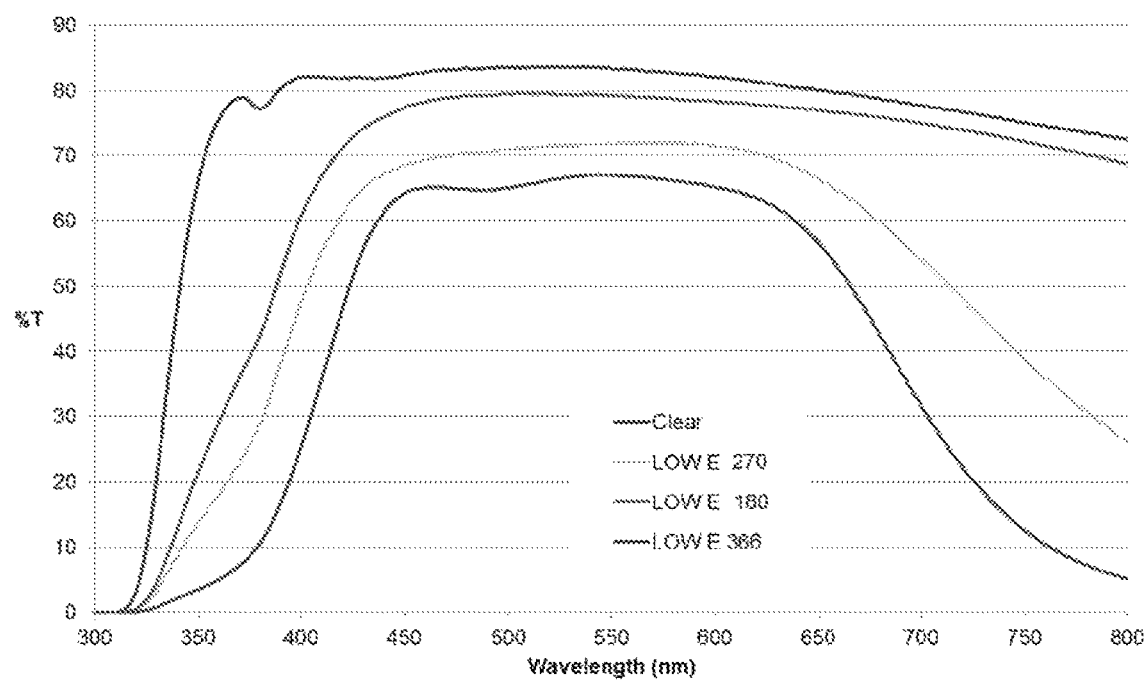
FIG. 2 illustrates low emissivity layer transmission spectra, as well as transmission spectra of a clear glass.

As seen from FIG. 2, a large portion of the light intensity that is needed for darkening the glass is absorbed by the low emissivity layers (e.g., low-e 270, low-e 180 and low-e 366 coatings), which are Ag comprising coatings the commonly utilized in multipaned windows.)

Figure 3A:
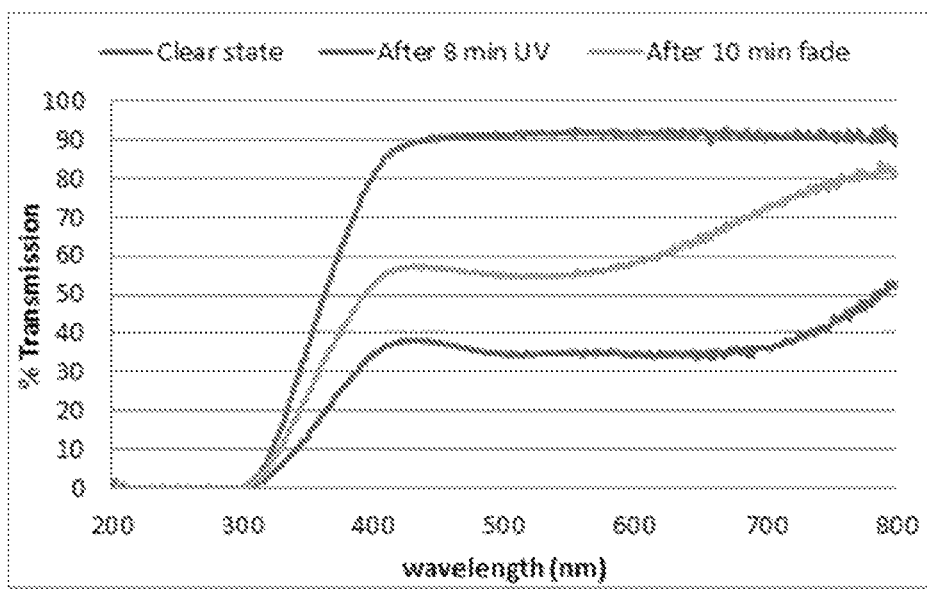
FIGS. 3A and 3B are plots of light transmittance (%) vs. wavelength (nm) for a 1.6 mm thick photochromic glass sample corresponding to Example 26 and 13 glass embodiments, respectively.
Figure 3B:
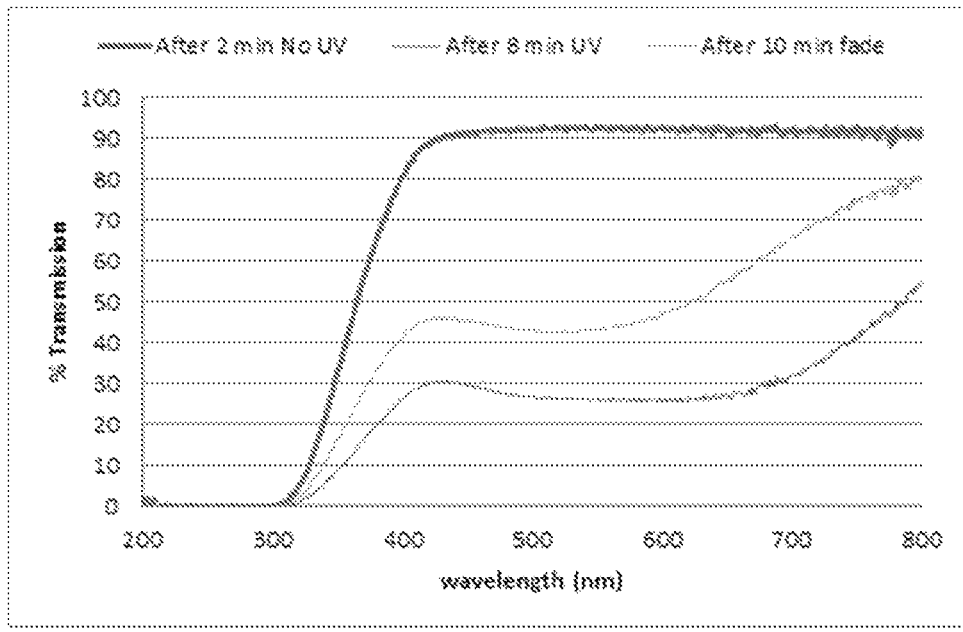

FIGS. 3A and 3B illustrate the percent transmittance (at 550 nm) for two embodiments of the photochromic glass (1.6 mm thickness at 20° C.) as a function of wavelength (nm.) It is noted that both of these exemplary glass embodiments have high transmittance % T (also referred to as transmission herein), in the visible wavelength range when in a clear state (top curve plots). More specifically, FIG. 3A provides the percent transmittance for one embodiment of the photochromic glass (glass Example 26 of Table 3), as a function of wavelength (nm) exposure. It illustrates % transmission at a clear state (no significant exposure, top curve), for exposure at a faded state after 10 min fade (middle line), and at a darkened state (after 8 min exposure to UV, bottom line). FIG. 3B provides the percent transmittance for another embodiment of the photochromic glass (glass Example 13 of Table 2) (as a function of wavelength (nm) exposure for a clear state (no significant exposure, top line), for exposure at a faded state after 10 min fade (middle line), and for a darkened state (after 8 min exposure to UV, bottom line).

Figure 4:
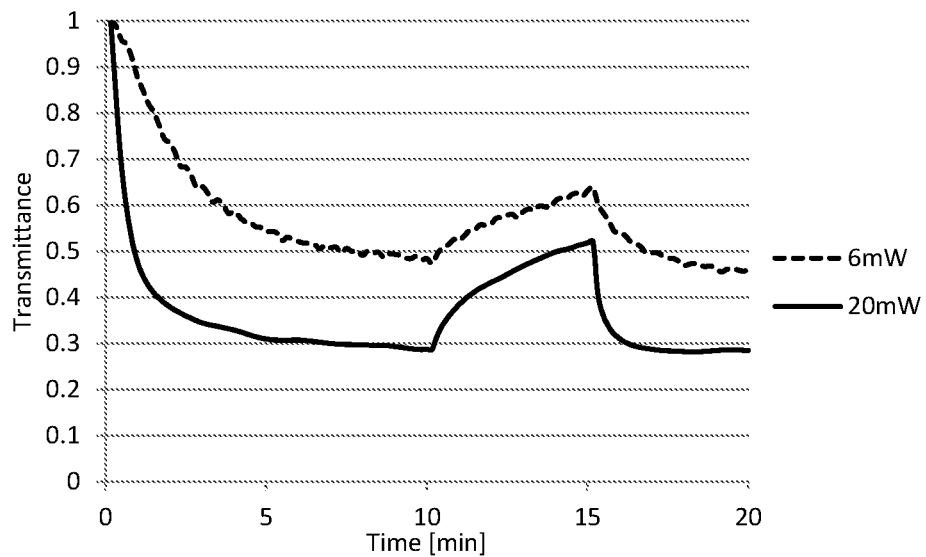
FIG. 4 illustrates darkening behavior of an example photochromic glass when illuminating light intensity is changed from 6 mW to 20 mW, and is a plot of light transmittance (%) vs. wavelength (nm) for a 1.6 mm thick photochromic glass pane.

The thickness of photochromic glass (e.g., the photochromic portion of a laminated glass pane) of the present disclosure may be, for example, from about 1 mm to about 6 mm, or from about 2 mm to about 4 mm, or from about 1 mm to about 2 mm, or even from about 1 mm to about 1.7 mm FIG. 4 is a plot of transmittance at 550 nm wavelength as a function of time. More specifically, FIG. 4 illustrates darkening behavior of an example glass composition when illuminating light intensity (provided with a mercury lamp) is changed from 6 mW to 20 mW. The lamp is initially blocked, then the sample is illuminated for 10 minutes followed by blocking for 5 minutes to let the sample fade and then last again darkening for 5 minutes. This schedule allows evaluation of the kinetics of darkening and fading of the glass sample. The transmission of the glass sample is measured with a separate very low intensity green light laser beam.

Tables 1-3 (see below) disclose a variety of compositions including embodiments that are good photochromic glasses (i.e. dark state transmission 30% or below), and also disclose compositions of comparative glass examples that do not exhibit photochromism. In order for any of the photochromic glass embodiments described herein to exhibit photochromism, the glass has to undergo a heat treatment (at the temperature $T_h$) that results in the formation of the silver-halide phase within the glass. The time and temperature of the heat treatment can be varied within some range. The exemplary heat treatment temperatures ($T_h$) utilized to get the photochromic glass behavior in at least some of the embodiments of the glass disclosed herein are provided in Tables 1-3.

Generally, for the heat treatment, we utilized temperatures ($T_h$) between 655° C. and 700° C. (e.g., 665° C. to 695° C.), and heat treatment times are from about 5 min (e.g., 10, 15, 20, 30 min, or therebetween) min to about 4 hours. Heat treatment time and temperature determine the size and distribution of the silver-halide droplets within the glass, but also the exact chemistry of the silver-halide phase can be affected with the cooling rate utilized, when cooling the glass down from the heat treatment temperature. The glass cooling rate may be, for example, 10 C/min, or faster. In the embodiments of Tables 1-3, a furnace cool down (i.e., cooldown within the furnace) was utilized for all example glasses. In this example embodiments, an initial cooling rate of about 10° C./min was utilized to bring the glass to a temperature of about 400° C., and then the glass was cooled down to the room temperature at a slower rate.

There are some general guidelines (for example use of $P_2O_5$), discussed below (for example, use of $P_2O_5$) for selection of composition for the base glass (i.e. composition of the base glass matrix that does not include photochromic elements) that includes high $SiO_2$ amounts ($SiO_2$>65 mol %) that photochromic behavior of the glass. Once the base glass composition is chosen the next step is to optimize the photochromic package—i.e., the amounts of photochromic elements in the glass such as, for example, the amounts of Ag, CuO, Cl and B).

It should be taken into account during melting that the halide volatility is quite high, though dependent of composition of base glass, and further that the retention of silver is linked to the halide retention. For example, to reduce volatization, it is preferred to use "overbatching", and that the glass be melted at the lowest possible temperature.

Figure 5:
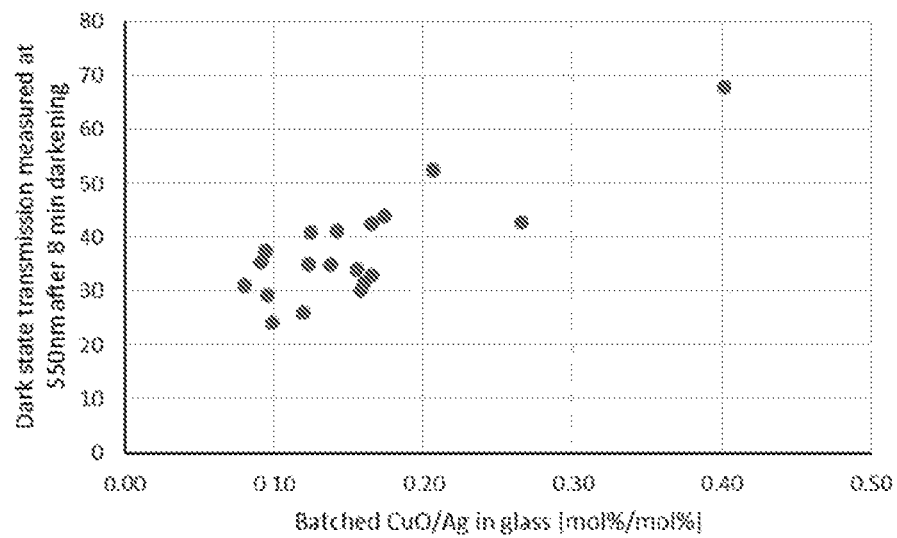
FIG. 5 illustrates the effect of Ag to CuO ratio on glass properties.
Figure 6:
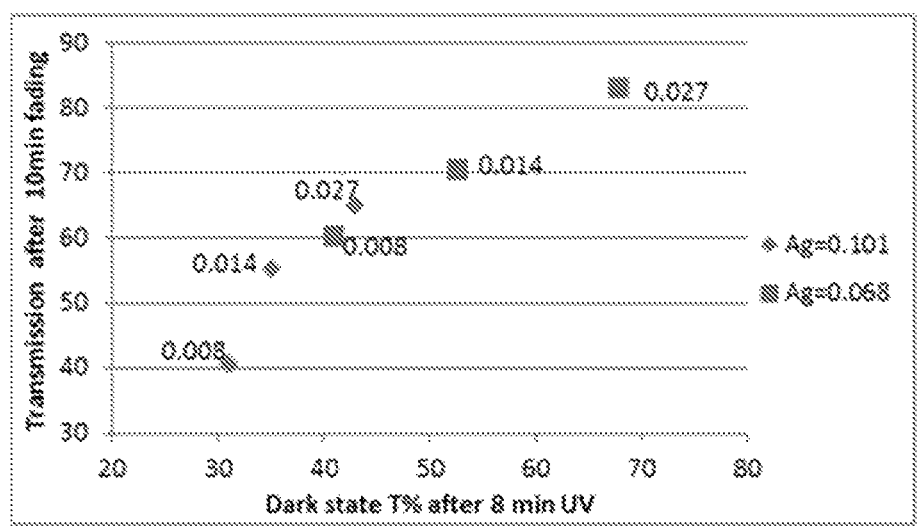
FIG. 6 illustrates the effect of Ag and CuO content on glass properties.

The amounts of photochromic elements in the glass is correlated with the chemistry that goes into the silverhalide phase during the heat treatment when the Ag-halide is formed. For example, a higher Ag content, while keeping the amounts of other photochromic elements constant, generally results in a darker glass (at least for the glasses containing up to about 0.15 mol % Ag). CuO is known to affect both maximum darkening level and fade rate. A certain amount of Cu is needed in the Ag-halide phase to enable the reduction of silver. Too little copper in the Ag-halide phase limits how much $Ag^0$ can be formed, which causes the glass not darken to its full potential. With higher batched CuO, a maximum darkening level is achieved, until too much CuO is added. The more Cu in the Ag-halide structure, the shorter is the diffusion path for $Ag^0$ to get back its electron, and the faster the glass will fade. Thus, there is an optimal range to how much Cu is needed as in the Ag-halide. The CuO amount in the glass (0.07 mole % to 0.18 mol %) should be matched with the Ag content (e.g., 0.006 mole % to 0.15 mole %, or 0.0065 mole % to 0.15 mole %), because the ratio of CuO/Ag in the glass and thus in the amount of halide crystals affect the amount of maximum darkening (% T after darkening) that can be provided by the photochromic glass. The preferred ratio of CuO/Ag is ≤0.20, more preferably ≤0.18, and even more preferably ≤0.17 (for example 0.07 to 0.17). This relationship between CuO and Ag is illustrated in FIG. 5 for a base glass composition matching Example glass #17 (see Table 2) where the photochromic agents of the photochromic package (CuO, Cl, Ag) have been varied for each data point of the figure. FIGS. 5 and 6 illustrate the effect of Ag and CuO content on glass properties.

More specifically, FIG. 5 illustrates the effect of the ratio of CuO to AgO (batched CuO (mol %)/AgO (mol %) in glass, horizontal axis) on dark state transmission (% T, vertical axis), measured at 550 nm wavelength after 8 minutes of darkening. This graph illustrates that the photochromic glass achieves the lowest transmission when the ratio of Cu (mol %) to Ag (mol %) is between about 0.7 and about 0.3, preferably between about 0.7 and about 0.2, or between 0.75 and 0.18, for example between 0.8 and 0.18.

FIG. 6 illustrates glass transmission % T after 10 minutes of fading (vertical axis) vs dark state transmission (% T, vertical axis), measured at 550 nm wavelength after 8 minutes of darkening (% T, horizontal axis), for the embodiments of photochromic glass compositions corresponding to FIG. 5 corresponding to two Ag levels (0.101 mol % and 0.068 mole %).

For the measurements shown in FIGS. 5 and 6, the base glass chemistry was held constant (same as in Example #17 glass), we used two different Ag levels, and then the CuO content has been changed for both levels of Ag (CuO levels ranged from 0.008 mole % to 0.027 mol %). The CuO content corresponding is written next to each dot in FIG. 6. (That is, FIG. 6 illustrates dependence between dark state transmission after 10 min fading time for a fixed base glass composition (see Example 17 glass, Table 2) where the amount of CuO level (written next to each dot) was varied at two different Ag levels, both in mol %.) We discovered that the higher Ag results in darker glass (dark state transmission is low)), that lower copper also results in darker glass (dark state transmission is low), but lower copper amounts also results in less fading, so even after stopping UV illumination it takes a long time before it clears. It is desirable to be able to achieve the dark glass dark state of the glass but with as fast fading as possible. Based on the required properties of the photochromic glass one thus should select combination of Ag and CuO that satisfies these properties.

Tables 1-3, below, disclose twenty-six photochromic embodiments of glass compositions and their properties. In the glass embodiments of Tables 1-3, the glass compositions comprise no Pb, no ZrO, and no SrO. Also, the glass embodiments of Tables 1-3 contain no $Nb_2O_5$. The measured density of several of the glasses described in Tables 1-3 were 2.28 $g/cm^3$ to 2.32 $g/cm^3$. In these tables, glass transmittance in the darkened state and after 5 minutes of fading is designated as T % dark and T % F5 (also referred to as $T_{f5}$), respectively. Darkening performed with a 20 mW lamp power and filtering the light with a low-e coated sodalime, where the low-e coating was a 3-layer E-366 coating.

TABLE 1

| Glass Example | 1 | 2 | 3 | 4 | 5 | 6 | 7 | 8 | 9 | 10 |
|---|---|---|---|---|---|---|---|---|---|---|
| SiO2 | 70.7 | 68.8 | 70.9 | 68.8 | 72.8 | 72.7 | 74.8 | 70.9 | 66.8 | 68.8 |
| Al2O3 | 6.0 | 6.0 | 4.0 | 6.0 | 6.1 | 6.0 | 6.0 | 2.0 | 6.0 | 8.0 |
| B2O3 | 12.4 | 12.3 | 12.3 | 12.3 | 12.3 | 10.5 | 8.4 | 12.3 | 12.3 | 10.3 |
| P2O5 | 2.0 | 4.0 | 3.9 | 2.0 | 0.0 | 2.0 | 2.0 | 5.9 | 5.9 | 2.0 |
| Na2O | 1.1 | 1.1 | 1.1 | 1.1 | 1.0 | 1.0 | 1.0 | 1.1 | 1.1 | 1.0 |
| K2O | 7.7 | 7.7 | 7.6 | 7.7 | 7.7 | 7.7 | 7.7 | 7.7 | 7.8 | 9.7 |
| MgO | 0.0 | 0.0 | 0.0 | 1.9 | 0.0 | 0.0 | 0.0 | 0.0 | 0.0 | 0.0 |
| Ag | 0.075 | 0.084 | 0.086 | 0.083 | 0.072 | 0.074 | 0.073 | 0.096 | 0.090 | 0.073 |
| CuO | 0.011 | 0.013 | 0.014 | 0.012 | 0.012 | 0.012 | 0.011 | 0.014 | 0.013 | 0.011 |
| Cl | 0.193 | 0.198 | 0.195 | 0.230 | 0.151 | 0.154 | 0.134 | 0.256 | 0.222 | 0.177 |
| Br | 0.032 | 0.034 | 0.039 | 0.040 | 0.030 | 0.027 | 0.025 | 0.060 | 0.039 | 0.030 |
| Heat treatment temp (° C.) and time | 665° C./ 1 h | 665° C./ 1 h | 665° C./ 1 h | 665° C./ 1 h | 665° C./ 1 h | 665° C./ 1 h | 665° C./ 1 h | 665° C./ 1 h | 665° C./ 1 h | 665° C./ 1 h |
| T % dark | 38.8 | 15.3 | 29.6 | 36.3 | 90 | 31.6 | 56.0 | 90 | 28.5 | 90 |
| T % F5 | 61.9 | 23.1 | 31.2 | 59.6 |  | 33.6 | 56.2 |  | 36.1 |  |
| comment |  |  |  |  | No darkening |  |  | No darkening Phase separated |  | No darkening |
| T (anneal) [° C.] | 550.5 | 535.2 | 540 | 554.2 | 560.9 | 568.6 | 582.8 |  | 530.5 |  |
| T (soft) [C] |  | 788 | 773 | 809 | 825 | 827 | 850 |  | 781 |  |
| Density [g/cm³] | 2.293 |  |  |  |  |  |  |  |  |  |
| T(200P) [° C.] | 1660 | 1689 | 1600 | 1683 | 1707 | 1759 | 1807 |  | 1669 |  |
| T(35 kP) [° C.] | 1113 | 1120 | 1088 | 1137 | 1122 | 1167 | 1202 |  | 1109 |  |
| Viscosity at 665° C. |  | 4.74E+9 | 2.6E+9 | 1.31E+10 | 2.22E+11 | 2.83E+10 | 7.25E+10 |  | 3.56E+9 |  |

TABLE 2

| Glass Example | 11 | 12 | 13 | 14 | 15 | 16 | 17 | 18 | 19 |
|---|---|---|---|---|---|---|---|---|---|
| SiO2 | 70.63 | 70.56 | 70.55 | 70.09 | 70.61 | 70.55 | 70.18 | 70.53 | 70.48 |
| Al2O3 | 6.04 | 4.00 | 6.00 | 6.13 | 6.02 | 6.02 | 6.04 | 6.03 | 6.02 |
| B2O3 | 12.45 | 12.44 | 10.33 | 10.60 | 8.42 | 12.37 | 12.71 | 12.37 | 12.24 |
| P2O5 | 0.00 | 1.99 | 2.00 | 1.98 | 1.95 | 1.98 | 1.98 | 1.99 | 1.97 |
| Na2O | 1.11 | 1.12 | 1.15 | 1.14 | 1.14 | 1.14 | 1.72 | 1.18 | 6.80 |
| K2O | 7.71 | 7.84 | 7.90 | 7.94 | 7.80 | 7.79 | 7.23 | 7.78 | 2.36 |
| MgO | 1.92 | 1.92 | 1.92 | 2.00 | 3.93 | 0.02 |  |  |  |
| Ag | 0.093 | 0.094 | 0.094 | 0.089 | 0.092 | 0.093 | 0.091 | 0.079 | 0.085 |
| cuo | 0.012 | 0.012 | 0.012 | 0.012 | 0.012 | 0.011 | 0.009 | 0.007 | 0.008 |
| Cl | 0.187 | 0.170 | 0.172 | 0.172 | 0.189 | 0.154 | 0.173 | 0.154 | 0.206 |
| Br | 0.038 | 0.036 | 0.034 | 0.038 | 0.034 | 0.033 | 0.031 | 0.038 | 0.058 |
| Heat treatment temp (° C.) and time | 695° C./ 1 h | 695° C./ 1 h | 695° C./ 4 h | 695° C./ 0.5 h | 695° C./ 0.5 h | 695° C./ 1 h | 695° C./ 1 h | 695° C./ 1 h | 695° C./ 1 h |
| T% dark | 72.0 | 10.6 | 15.8 | 23.7 | 26.4 | 23.6 | 29.3 | 37.6 | 52.6 |
| T% F5 | 83 | 13.6 | 31.4 | 38.9 | 42.2 | 29.5 | 39.0 | 45.1 | 54.9 |
| Comment | Very little darkening | Very slow fade |  |  |  |  | Very slow fade |  |  |
| T (anneal) [° C.] |  |  |  | 571.1 | 599.9 |  | 542.9 | 551.2 | 534.7 |
| T (soft) [C] | 802 | 813 | 826 | 842 | 879 |  | 775 | 793 | 759 |
| Density [g/cm³] |  | 2.305 | 2.312 | 2.304 | 2.309 | 2.318 | 2.293 | 2.293 | 2.293 | 2.294 |

TABLE 2-continued

| Glass Example | 11 | 12 | 13 | 14 | 15 | 16 | 17 | 18 | 19 |
|---|---|---|---|---|---|---|---|---|---|
| T (200P) [° C.] | 1677 | 1573 | 1725 | 1721 | 1724 | 1676 | 1647 | 1660 | 1645 |
| T (35 kP) [° C.] | 1118 | 1073 | 1150 | 1180 | 1215 | 1111 | 1112 | 1113 | 1077 |
| Viscosity at 665° C. | | 3.51E+11 | 4.57E+10 | 4.44E+10 | 2.58E+11 | 1.23E+10 | 1.99E+9 | 7.29E+9 | 1.65E+9 |
| Liquidus viscosity | | | | | | | 2.5 MP | 4.2 MP | 0.5 MP |

TABLE 3

| Glass Example | 20 | 21 | 22 | 23 | 24 | 25 | 26 |
|---|---|---|---|---|---|---|---|
| SiO2 | 69.51 | 69.77 | 71.68 | 71.14 | 71.10 | 69.46 | 70.32 |
| Al2O3 | 6.23 | 6.02 | 6.02 | 6.14 | 6.07 | 6.07 | 6.02 |
| B2O3 | 12.82 | 13.36 | 13.27 | 13.37 | 12.01 | 13.55 | 12.67 |
| P2O5 | 2.04 | 1.98 | 1.99 | 2.04 | 1.98 | 1.99 | 1.98 |
| Na2O | 1.32 | 3.13 | 1.10 | 1.17 | 1.10 | 3.19 | 1.60 |
| K2O | 7.96 | 5.64 | 5.85 | 6.02 | 7.63 | 5.62 | 7.24 |
| MgO | | | | | | | |
| Ag | 0.082 | 0.089 | 0.048 | 0.079 | 0.057 | 0.090 | 0.101 |
| CuO | 0.013 | 0.010 | 0.005 | 0.006 | 0.007 | 0.009 | 0.014 |
| Cl | 0.174 | 0.17 | 0.30 | 0.32 | 0.193 | 0.239 | 0.172 |
| Br | 0.035 | 0.05 | 0.03 | 0.04 | 0.027 | 0.022 | 0.025 |
| Heat treatment temp (° C.) and time | 665° C./ 4 h | 665° C./ 4 h | | | | 665° C./ 4 h | 665° C./ 4 h |
| T % dark | 20.7 | 47 | 77 | 87 | 40 | 23.8 | 35 |
| T % F5 | 42.18 | | | | | 50.87 | 50 |
| comment | | | | | Slow darkening. | | |
| T (anneal) [° C.] | 546 | | | | | | 540 |
| T (soft) [C] | 787 | | | | | 766 | |
| Density [g/cm³] | 2.298 | | | | 2.282 | | |
| T (200P) [° C.] | 1671 | 1667 | | | | 1670 | 1647 |
| T (35 kP) [° C.] | 1103 | 1117 | | | | 1108 | 1110 |
| Viscosity at 665° C. | 8.84E+9 | | | | | 1.3E+9 | |
| Liquidus viscosity | 2.7 MP | | | | | 1.16 MP | 2.4 MP |

Regarding base composition of the photochromic glass, based on the results shown for the glass compositions of Tables 1-3, we can conclude that:

(i) $P_2O_5$ is necessary for photochromic behavior. For example, glasses #5 and #11 have $P_2O_5=0$ mol %, and they are not photochromic. Glass #11 is modification of glass 16 where $P_2O_5$ is removed and MgO was utilized instead. As soon as all $P_2O_5$ is out, almost the glass exhibited almost no photochromic behavior;

(ii) When $P_2O_5$ content becomes high it may not anymore favorably affect photochromic properties of the glass. It is preferable that the amount of be $P_2O_5 \leq 6$ mol %, and more preferably $P_2O_5 \leq 4$ mol %. (See glass #2 and #9, Table 1). Dark state transmission is considerably lower for glass example #9 than for glass example #2. Also, high $P_2O_5$ content seems to increase foaming in the melting process, thus it is preferable to have >6 mol % $P_2O_5$.

(iii) Combination of low $Al_2O_3$ and high levels of $P_2O_5$ increase phase separation. Therefore, glass with the a higher $Al_2O_3$ and high $P_2O_5$ amounts (e.g., 6 mol %) can be made with good properties (See glasses #8 and #9, Table 1).

(iv) The type of alkali chosen plays considerable role. Comparing glass examples #18 and 19 of Table 2, we can see that $K_2O$ enables higher (stronger) darkening for this family of glasses. Glass example 18 has even lower a Ag content than Glass example 19, which should decrease its darkening level (but despite that, due to the higher the high $K_2O$, glass Example 19 becomes darker). Thus, it is beneficial that the majority of alkali be $K_2O$. However, too high $K_2O$ levels may cause foaming during glass melting. Accordingly, to keep the glass melt from unwanted foaming, $Na_2O$ can be used in conjunction with somewhat reduced amount of $K_2O$.

(v) MgO can be used in low amounts. Glasses #16, 15 and 13 (see Table 2) illustrate progressive $B_2O_3$ removal and batching instead MgO. Over 4 mol % MgO also increases the 200 P temperature to much higher than 1700° C., which is not desirable from the melting point of view.

(vi) Comparing Glass examples #4 and #13, slightly less boron may considerably increase darkening of the glass. This would be related to how the alkali are bound to the glass and how much tetrahedral boron there is in the glass. There actually is some optimal boron level, as seen when comparing glasses #1, #6, and #7. The amount of boron in these glasses decreases from 12.4 mol % to 10.5 mol % and to 8.4 mol % (reduction of $B_2O_3$ is batched as $SiO_2$), with Ag and CuO staying about constant. In this series the glass 10.5 mol % $B_2O_3$ exhibits the most darkening.

Figure 7:
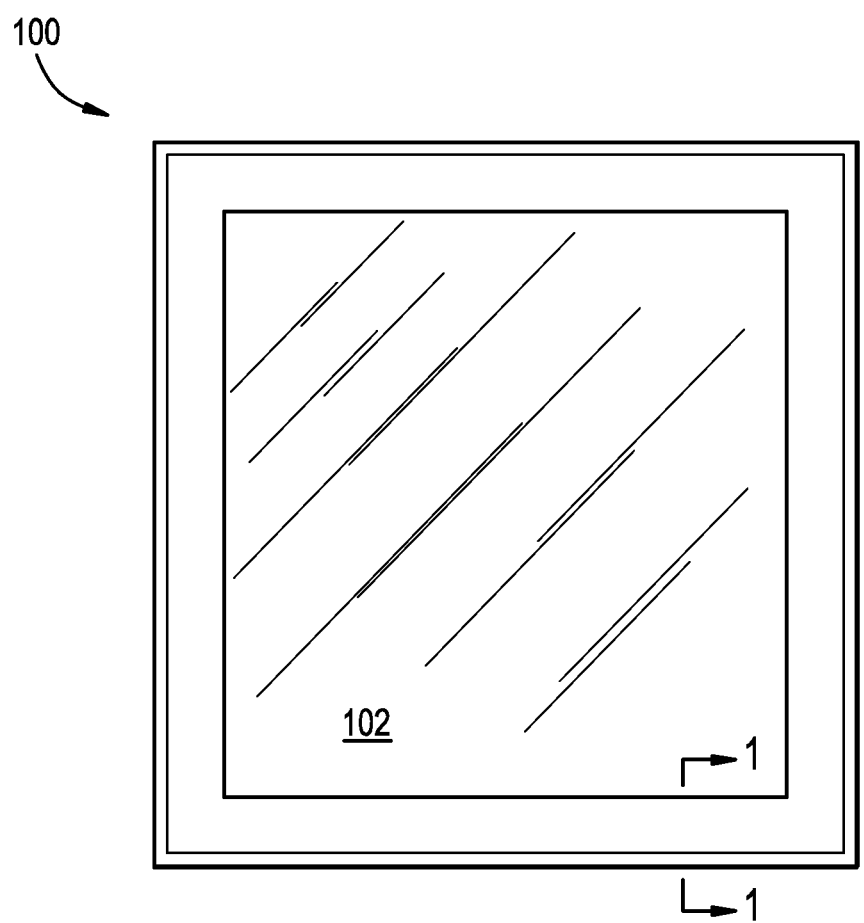
FIG. 7 is a front view of a multi-pane window as seen from the outside of a structure according to one embodiment.

The present disclosure is also directed to a multi-pane window 100 with a low emissivity layer and the photochromic glass(es) described herein. Window 100 may be an architectural window, for example. Accordingly, window 100 may be integral with an opening between the exterior and interior of an enclosure or building. Further, window 100 may be part of a door system on an enclosure or building. In the embodiments described herein, window 100 is movable with respect to an opening in a building. FIG. 7 provides an example of window 100. Of course, various dimensions and shapes of window 100 are possible and in accordance with the present disclosure. Window 100 shown in FIG. 7 may be a double pane or a triple pane window. Of course, window 100 may include any number of glass panes great than one pane. Window 100 may further include a spacer 421 between its panes. Spacer 421 may be an edge seal formed around respective edges of its glass panes, a metallic pillar between the surfaces of its glass panes, a low thermal conduction material, or a glass bump attached to or formed integral with one or both glass panes. Spacer 421 may assist in creating a space between its glass panes. Window 100 may further include a frame 420 around the edges of its glass panes.

In embodiments, frame 420 is configured to mate or communicate with an opening in a building or enclosure such that window 100 installed with inside glass pane 202 adjacent the building interior and outside glass pane 102 adjacent the building exterior. In embodiments, frame 420 includes an overhanging edge portion configured to interfere with an edge of an opening in a building or enclosure and to prevent window 100 from being installed in the opening such that outside glass pane 102 is adjacent the building interior. Window 100 may also include a locking mechanism adjacent inside glass pane 202 and internal to the building or enclosure. In embodiments, the locking mechanism is configured to be accessible only from the building interior so as to limit access through window 100. In embodiments, the locking mechanism is fixed directly or indirectly to frame 420 and communicates with a portion opening in the building or enclosure.

Figure 8:
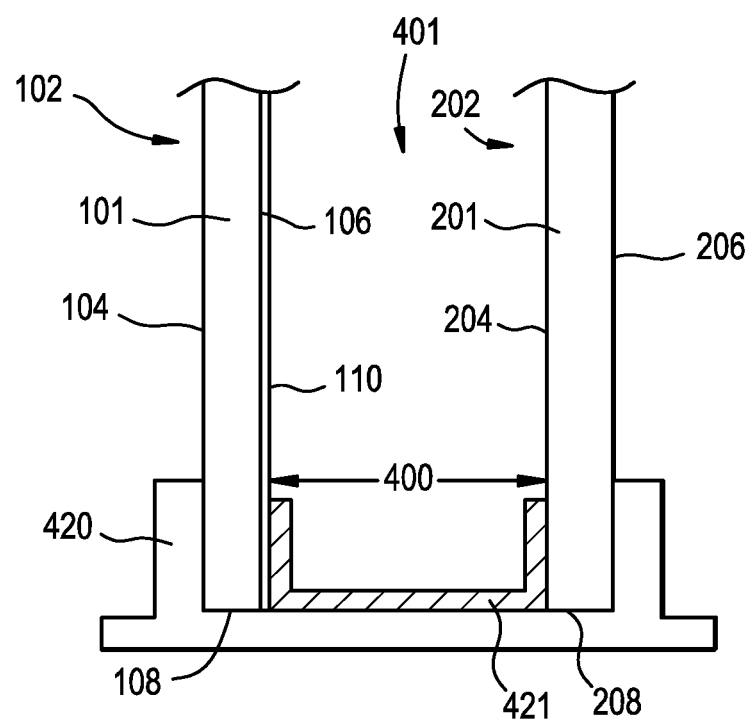
FIGS. 8-10 are cross-sectional views of the peripheral edge of a double-pane window, drawn along line 1-1 of FIG. 7, according to some examples.

Referring to an example of a double pane embodiment of window 100 shown in FIG. 8 (a cross-section of a peripheral edge of window 100 in FIG. 7), window 100 includes an outside glass pane 102 and an inside glass pane 202 with a space 401 there between. Outside glass pane 102 and inside glass pane 202 face each other and are spaced apart from and disposed substantially parallel each other. Space 401 is defined at least in part by a distance 400 between pane 102 and 202. Distance 400 may be from about 50 microns to about 50 mm, or from about 5 mm to about 25 mm. Space 401 may be sealed and include an insulating gas such as air, argon, krypton, xenon, and combinations thereof. Alternatively, space 401 may be sealed and include a pressure less than atmospheric pressure. Inside and outside glass pane 202, 102 may also be configured as a vacuum insulated glass window as described in U.S. Pat. No. 8,821,999.

Exemplary glass panes (photochromic glass, non-photochromic glass, or otherwise) can have any suitable dimensions. Panes can have physical (length and width) dimensions that independently range from about 0.1 m to about 10 m (e.g., 2, 5, 10 m) and a thickness dimension that can range from about 0.1 mm to about 10 mm (e.g., 0.5, 1, 2, 5, 7 mm). Lateral dimensions and thicknesses of glass panes 102, 202, 302 in window 100 provide a rigid structure.

In embodiments, outside glass pane 102 is for interaction with outdoors. In embodiments, outside glass pane 102 is configured to be on the outside of an enclosure or adjacent a building exterior and exposed to weather, ambient conditions, and/or direct sunlight. Outside glass pane 102 may also be referred to as external glass pane 102 and/or exterior glass pane 102 herein. Inside glass pane 202 is for interaction with the indoors. That is, inside glass pane 202 is configured to be on the inside of an enclosure or building and exposed to conditions therein, including climate controlled conditions such as heating and/or air conditioning. Inside glass pane 202 may also be referred to as internal glass pane 202 and/or interior glass pane 202 herein.

In embodiments, outside glass pane 102 includes a body 101 with an outside surface 104 opposite an inside surface 106. In embodiments, outside surface 104 is directly exposed to the outdoors. In embodiments, inside surface 106 is adjacent space 401 between panes 102, 202. In embodiments, outside glass pane also includes at least one outer edge 108. In embodiments, outside glass pane 102 may include additional surfaces and/or edges. In embodiments, outside glass pane 102 is formed from a glass material and includes a low emissivity layer 110. Low emissivity layer 110 may be on surface 104, on surface 106, and/or at a location between surfaces 104 and 106. In one embodiment, shown in FIG. 8, low emissivity layer 110 is on surface 106 such that low emissivity layer 110 is shielded from weather and other outdoor elements. Yet in alternative embodiments, outside glass pane 102 may be entirely comprised of a low emissivity composition, in which case the low emissivity layer 110 would occupy the entire body 101 of the outside glass pane.

As is illustrated in FIG. 1, which illustrates the approximate transmission spectra of two of the many contemplated low emissivity layers according to the present disclosure, the low emissivity layer 110 selectively transmits light in different parts of the optical spectrum through optical absorption, reflection, or a combination thereof. Referring collectively to FIGS. 1 and 7, the low emissivity layer 110 selectively blocks transmission of IR and NIR wavelengths from the outdoors and, as such, minimizes heat transfer into space 401, onto inside glass pane 202, and/or across window 100 into the enclosure or building. This selective transmission may also reduce heat gain and transfer of heat to photochromic glass materials in the window 100.

More particularly, referring to the transmission spectra illustrated in FIG. 2, which correspond to double and triple layer silver low emissivity layers, low emissivity layers according to the present disclosure may be selected to comprise an infrared blocking threshold where the low emissivity layer blocks transmission of a portion of solar radiation in the IR and near-IR bands. For the purpose of the present disclosure, it is noted that low emissivity layers, which are commonly referred to as "Low-E" layers in the window industry, can be said to block a "significant" portion of IR and near-IR if they block enough IR and near-IR to be recognized in the industry as "Low-E" layers. In other embodiments, low-e layers block(s) a significant portion by reflecting and/or absorbing of at least about 50% or more of any individual wavelength in a band (e.g., IR, near-IR, etc.). In yet other embodiments, low-e layers block(s) a significant portion by reflecting and/or absorbing of at least about 50% or more of an average of all wavelengths in a band (e.g., IR, near-IR, etc.).

Each of the low emissivity layers illustrated in FIG. 2, for example, blocks a significant portion of wavelengths above about 700 nm, which corresponds to the start of the near-IR band. More particularly, at wavelengths above about 700 nm, the two low emissivity layers illustrated in FIG. 1 are less than about 70% and less than about 40% transmissive, respectively, and, more particularly, above about 2000 nm, both low emissivity layers are substantially non-transmissive. In particular embodiments, the aforementioned heat transfer can be sufficiently minimized by ensuring that the low emissivity layers according to the present disclosure, which are described in further detail below, will be selected such that they reach less than 10% transmittance at a wavelength from about 700 nm and about 2000 nm.

The glass material of outside glass pane 102 may be soda-lime glass, aluminosilicate glass, borosilicate glass, and/or combinations thereof. Visible light absorption and/or reflection by these the glass material of outside glass pane 102 may be negligible. The glass material of outside glass pane 102 is not photochromic glass. That is, outside glass pane 102 may include any substantially transparent, non-photochromic glass. Photochromic glass on outside pane 102 would be susceptible to the shortcomings of conventional windows including photochromic glass described above. Specifically, the photochromism of the photochromic glass may be partly dependent upon the temperature of the glass via heat transfer from outside ambient conditions. Thus, the various embodiments of the present disclosure may thermally isolate the photochromic glass from temperatures above or below room temperature, and yet still allow transmittance of specific wavelengths of light thereto to activate its photochromic properties.

Low emissivity layer 110 may be a film, a coating, or a layer on or within the glass material of outside glass pane 102, or may occupy the entire body 101 of the outside glass pane. Low emissivity layers of the present disclosure are not photochromic organic polymer films. Low emissivity layer 110 may be applied to or within outside glass pane 102 via magnetron sputtering vapor deposition (MSVD), pyrolysis, spraying, sputtering, and other similar processes.

In an example embodiment, low emissivity layer 110 of outside glass pane 102 selectively reflects and/or absorbs near infrared (NIR) and/or infrared (IR) light from solar radiation (from outdoors). For example, low emissivity layer 110 reflects and/or absorbs light having a wavelength from about 700 nm to about 1 mm, or from about 701 nm to about 40,000 nm, or from about 701 to about 2,000 nm. Selective reflection may include reflection of ≥80%, or even ≥95%, of NIR and IR wavelengths interacting with low emissivity layer from outside solar radiation. With a low emissivity layer 110, outside glass pane 102 may transmit ≤20%, or even ≤5% of NIR and/or IR light contacting outside glass pane 102. Percent transmittance by outside glass pane 102 including layer 110 may be calculated using the ISO 9050: 2003 Standard ("Glass in building—Determination of light transmittance, solar direct transmittance, total solar energy transmittance, ultraviolet transmittance, and related glazing factors), for example. Alternatively, percent transmittance may be calculated by other standards and codes adopted by the International Code Council (ICC). Outside glass pane 102 with low emissivity layer 110 may have solar heat gain of ≤60%, or even ≤40% as a result of solar light contacting pane 102.

In one embodiment, low emissivity layer 110 transmits light in the visible spectrum. In embodiments, layer 110 transmits light having a wavelength from about 350 nm to about 700 nm, or transmits light having wavelength from about 390 nm to about 700 nm, or transmits light having wavelength from about 350 nm to about 420 nm. Light transmitted by low emissivity layer 110 within the above disclosed ranges may activate the photochromism of photochromic glass materials in window 100. Activation of the photochromism of photochromic glass materials according to the present disclosure may cause darkening of the glass, or a reduction in the fraction of visible light transmittance there through by 40% or more, or 50% or more, or 60% or more, or 70% or more, or 80% or more, up to 99%. In embodiments, low emissivity layer 110 of outside glass pane 102 may reflect and/or absorb UV light from about 100 nm to about 310 nm impinging thereon from outdoors.

Absorption and/or reflection of IR and NIR wavelengths from the outdoors by the low emissivity layer minimizes heat transfer into space 401, onto inside glass pane 202, and/or across window 100 into the enclosure or building. This absorption and/or reflection of IR and NIR wavelengths by layer 110 may also reduce heat gain and transfer of heat to photochromic glass materials. In one embodiment, low emissivity layer 110 may be configured to selectively transmit specific wavelengths through pane 102 for interaction with photochromic glass on panes 202, 302. In an example embodiment, the specific wavelengths may be from about 350 nm to about 700 nm, or from about 390 nm to about 700 nm, from about 350 nm to about 420 nm, or even from about 390 nm to about 420 nm. Interaction of these specific light wavelengths with the photochromic glass, at suitable intensities, and for a suitable duration, may activate and darken the photochromic glass. Darkened photochromic glass may have an about 50% or more decrease in the visible light transmittance there through. Despite its reflective and absorptive properties, low emissivity layer 110 of pane 102 may transmit some non-visible wavelengths of electromagnetic radiation impinging thereon. In one embodiment, low emissivity layer 110 of pane 102 transmits ≥50% of visible light wavelengths from outside solar radiation, or ≥60%, or ≥70%, or even ≥95%.

Low emissivity layer 110 may have an average thickness from about 1 nm to about 500 nm on the surface of a pane of window 100. Low emissivity layer 110 may be comprised of several layers to create a total thickness. The layers may be disposed adjacent to one another. In alternative embodiments, low emissivity layer 110 may be comprised of several layers spaced apart that cumulatively form the total thickness. In exemplary embodiments, low emissivity layer has a thickness from about 50 nm to about 250 nm, or even from about 100 nm to about 150 nm.

Low emissivity layer 110 may also be a coating formed from a plurality of layers. For example, the low emissivity coating may include an infrared-reflecting layer and one or more transparent inorganic layers. The infrared-reflecting layer and one or more transparent inorganic layers may be arranged in any configuration including several alternative layers of each. The infrared-reflecting layer may include a conductive metal such as silver, gold, copper, and combinations thereof, that reduces the transmission of heat through the coated pane. The inorganic layer within the low emissivity coating can be used to reflect near-infrared and infrared light and to control other properties and characteristics of the coating, such as color and durability. Inorganic materials include metal oxides including oxides of zinc, tin, aluminum, indium, bismuth, and titanium, among others. The inorganic layer of low emissivity layer 110 may include $SiO_2$, $Al_2O_3$, ZnO, $TiO_2$, $SnO_2$, and combinations thereof. In an exemplary embodiment, the top of low emissivity layer 110 may include a durability composition including oxides of silicon, aluminum (e.g., $SiO_2$ and $Al_2O_3$), and combinations thereof.

In window 100, panes including low emissivity layer according to embodiments may be SUNGATE® or SOLARBAN® low emissivity glass family products by PPG Industries; SUNGARD® low emissivity glass family products from Guardian; SOLAR-E® low emissivity glass family products from Pilkington-NSG; or PLANIBEL™ or COMFORT-AC™ low emissivity glass family products from Asahi Glass Company. In embodiments, low emissivity layer 110 comprises metallic silver, metallic nickel, silicon nitride, zirconium oxide, tin oxide, zinc oxide, and/or combinations thereof. Tin oxides include but are not limited to indium tin oxide and fluorine doped tin oxide.

Low emissivity layers of the present disclosure may be selected based on the photochromic properties of the photochromic glass such that the photochromic glass is activated (darkened) by specific light wavelengths transmitted by the low emissivity layer. For example, where the photochromic glass darkens upon exposure to light within a given activation band α, e.g., from about 350 nm and about 420 nm, the low emissivity layer may be selected such that it comprises a photochromic activation threshold, where the low emissivity layer transmits enough solar radiation in an activation band of the photochromic glass to enable solar radiation transmitted by the low emissivity layer of the outside glass pane in the direction of the inside glass pane to darken the photochromic glass and reduce visible light transmittance through the photochromic glass. In embodiments, activation band α includes any combination of activation wavelengths which reduce visible light transmittance through the photochromic glass. In embodiments, activation band α activates the photochromic effect of photochromic glass.

For surface sources, brightness can be approximated by luminance (measured in $cd/m^2$). However, due to the lack of a formal standardized definition of the term brightness, it is frequently avoided in technical publications. For the purposes of the present disclosure it is noted that reference herein to the darkening of the photochromic glass and the reduction of visible light transmittance through the photochromic glass should be understood to denote a readily recognizable change in the degree of humanly visible light passed by the glass, with the understanding that the aforementioned darkening, or reduction of light transmittance, would occur over a correspondingly recognizable amount of time, i.e., a duration on the order of a number of seconds or minutes, but not hours, and typically under direct, or nearly direct, sunlight. For example, in some embodiments, the aforementioned darkening effect would be achieved in less than about 8 minutes (see, for example, FIG. 1), with majority of darkening occurs, for example, in less than 3 min after saturation is reached. In other embodiments, the darkening effect would be achieved much more quickly, i.e., in less than a few seconds. In embodiments, the photochromic glass reduces visible light transmission there through when exposed to or contacted by an activation wavelength or band from at least 1 second to about 7-8 minutes.

More specifically, referring to the low emissivity layer transmission spectra illustrated in FIG. 2, which corresponds to single, double and triple layer silver low emissivity layers, each of these low emissivity layers transmits solar radiation at wavelengths between about 320 nm and about 400-420 nm, which corresponds to the activation band α of the photochromic glass. More particularly, the illustrated low emissivity layers are at least about 30% transmissive to wavelengths above about 370 nm and 390 nm, respectively, and, more particularly, are at least about 50% transmissive to wavelengths above about 370 nm and 410 nm, respectively.

Figure 10:
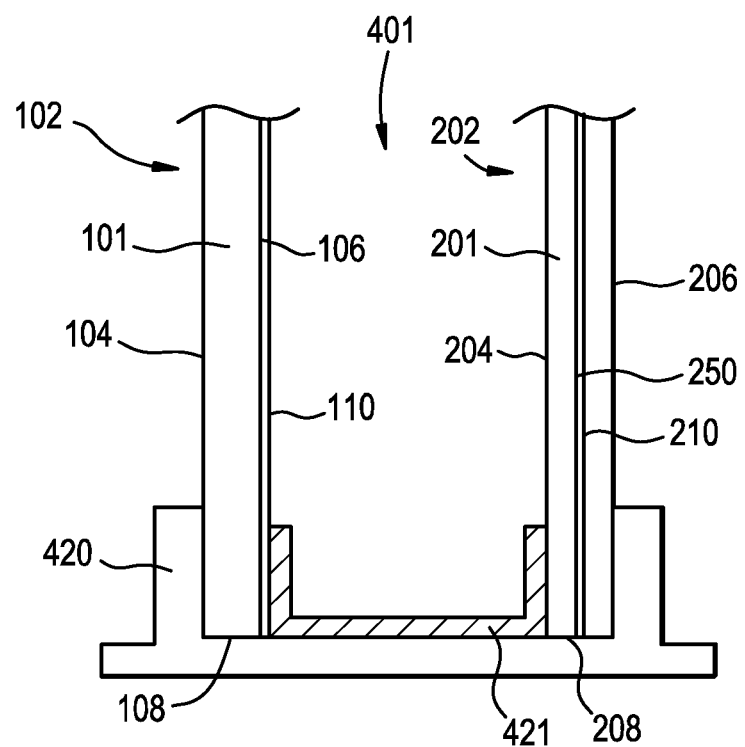
Figure 12:
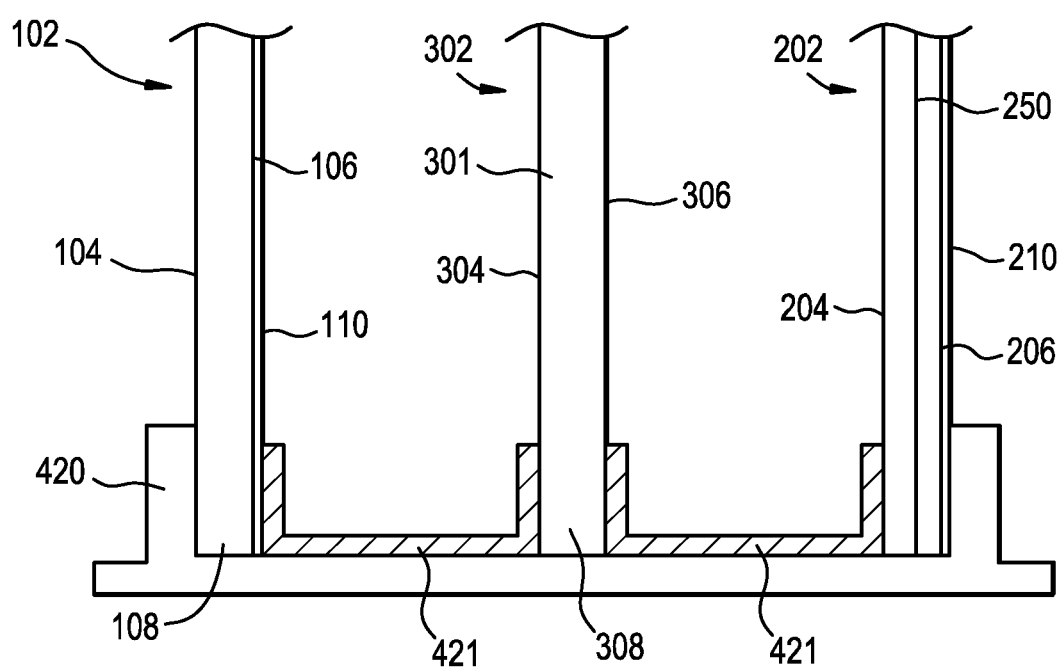

It is noted that the aforementioned selection criteria will typically only be applicable to low emissivity layers that are positioned between the source of outside solar radiation, i.e., the sun, and the photochromic glass. Where other low emissivity layers are utilized in other parts of a window assembly according to the present disclosure, for example, as part of an inside glass pane, as is illustrated in FIGS. 10 and 12, below, it will not typically be necessary, or particularly useful, to ensure that the wavelengths transmitted by the low emissivity layer activate the photochromic glass. In which case, where window assemblies constructed according to the concepts of the present disclosure incorporate low emissivity layers on opposite sides of the photochromic glass, as is the case in the embodiments of FIGS. 10 and 12, which are discussed in detail below, it may be preferable to select low emissivity layers with substantially different transmission characteristics. For example, it may be advantageous to ensure that any low emissivity layer disposed between the photochromic glass of the window assembly and an interior source of light, be selected to minimize transmittance of any wavelengths within the activation band α of the photochromic glass, as this would help ensure that the photochromic glass would not to react photochromically to inside light.

In embodiments such as FIG. 7, inside glass pane 202 includes a body 201 with an outside surface 204 opposite an inside 206. In embodiments, surface 206 is directly exposed to the indoors or is adjacent a building interior. In embodiments, surface 204 is adjacent space 401 between panes 102, 202. In embodiments, inside glass pane 202 also includes at least a first outer edge 208. In embodiments, inside glass pane 202 may include additional surfaces and/or edges. In embodiments, inside glass pane 202 may be formed in whole or in part from a photochromic glass material. That is, inside glass pane 202 may be a photochromic monolith or a glass laminate including a photochromic glass material. With inside glass pane 202 comprising the photochromic glass, the photochromic glass may be insulated from hot (e.g., ≥35° C.) and cold (e.g., ≤15° C.) outdoor temperatures that undesirably impact the photochromic effect as described above. In embodiments of the present disclosure, photochromic glass of glass pane 202 may be insulated from the outside ambient temperatures by glass pane 102, low emissivity layer 110, and/or space 401. In one embodiment, the photochromic glass of inside glass pane 202 is exposed to room temperature (e.g., about 20° C. to about 26° C.) conditions inside the structure.

In embodiments, photochromic glass of the present disclosure is an amorphous solid inorganic material. In embodiments, photochromic glass of the present disclosure may be substantially transparent when exposed only to visible light wavelengths. Photochromic glass of the present disclosure is configured to reversibly darken when exposed to activation wavelengths of solar light. Photochromic glass compositions of the present disclosure may comprise, in terms of mole percent (mol. %): (i) a glass matrix that is substantially free of rare earth elements, and of LiO, CaO, and BaO, the glass matrix comprising in mol percent (mol %) based on oxides: 66 mol %≤$SiO_2$≤75 mol %; 8 mol %≤$B_2O_3$≤13 mol %; mol %≤$Al_2O_3$≤7 mol %; 1.5 mol %≤$P_2O_5$≤6 mol %, mol %≤$Na_2O$≤5.5 mol %; 3 mol %≤$K_2O$≤9.5 mol %; 0 mol %≤MgO≤4 mol %; and (ii) a plurality of photochromic agents (i.e., a photochromic package)s, comprising in mol percent (%) with respect to the glass matrix: $0.07\% \leq Ag \leq 0.15\%$; $0.14\% \leq Cl \leq 0.25\%$; $0.025\% \leq Br \leq 0.04\%$; and $0.0065\% \leq CuO \leq 0.015\%$, such that the ratio of CuO/Ag≤0.22.

As described above, FIGS. 3A and 3B provides the percent transmittance for two embodiments of the photochromic glass. The thickness of photochromic glass (e.g., the photochromic portion of a laminated glass pane) of the present disclosure may be, for example, from about 1 mm to about 6 mm, or from about 2 mm to about 4 mm, or from about 1 mm to about 2 mm, or even from about 1 mm to about 1.7 mm. In alternative embodiments, the photochromic thickness in a glass pane of window 100 may be a single thickness or a combination of thicknesses in one or more photochromic glass panes laminated directly or indirectly together. Photochromic glass of the present disclosure may be selected based on the properties of the low emissivity layer such that the photochromic glass is activated (darkened) by specific light wavelength transmitted by the low emissivity layer. Photochromic glasses of the present disclosure are not and do not include photochromic organic polymers.

The Photochromic glass of the present disclosure may be activated by solar light transmitted through outside glass pane 102 (e.g., soda-lime glass, aluminosilicate glass, borosilicate glass, etc.) including layer 110. Photochromic glass of the present disclosure is passive (reactive to contact with solar output wavelengths) not require electricity for activation. That is, photochromic glass is characterized in that its optical transmittance decreases when exposed to actinic radiation or activation wavelengths but which returns to its original transmittance state upon elimination of this radiation. Photochromic glass of the present disclosure may be activated by visible solar light wavelengths transmitted through layer 110 on a glass pane. In embodiments, photochromic glass of the present disclosure is activated by light transmitted by layer 110 which may be any visible wavelength, may have any wavelength from about 350 nm to about 700 nm, or from about 390 nm to about 700 nm, or even from about 350 nm to about 420 nm. In embodiments, photochromic glass of the present disclosure is activated by actinic wavelengths or activation bands of wavelengths transmitted by outside glass pane 102 including layer 110. In an exemplary embodiment, photochromic glass exposed to solar light transmitted by layer 110 darkens to a level to reduce visible light transmittance there through by at least about 40%, or by about 50%, or by about 60%, or even by about 75%. In another exemplary embodiment, specific light wavelengths (e.g., from about 350 nm to about 700 nm) transmitted by layer 110 interacts with photochromic glass and darkens it to a level to reduce light transmittance there through by at least about 50%, or by about 60%, or even by about 75%. When darkened, photochromic glass of the present disclosure may transmit ≥10% of visible light that contacts outside glass pane 102. In another embodiment, darkened photochromic glass may transmit ≤50%, or even ≤35%, of visible light that contacts outside glass pane 102. Percent transmittance by the photochromic glass may be calculated using the ISO 9050: 2003 Standard, for example. Alternatively, percent transmittance may be calculated by other standards and codes adopted by the International Code Council (ICC).

Figure 9:
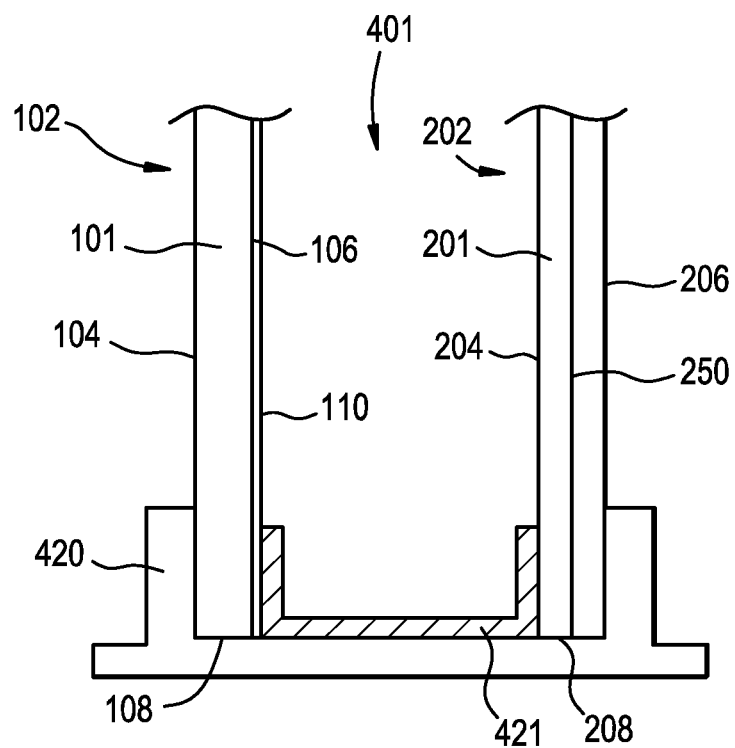

FIG. 9 illustrates an example embodiment of window 100 where pane 202 is a laminate of a non-photochromic glass and a photochromic glass with an interface 250 there between. In embodiments, one surface of inside glass pane 202 is formed from non-photochromic glass and the opposite surface is formed from photochromic glass. In embodiments, interface 250 is between the laminate components. Interface 250 is the area of transition within inside glass pane 202 from the non-photochromic glass material to the photochromic glass material. A bonding interlayer, which is substantially transparent to visible light, may be provided at the laminate interface 250. For example, and not by way of limitation, the boding interlayer may include a polymer. Bonding interlayer may include polyvinyl butyral (PVB), polycarbonate, acoustic PVB, ethylene vinyl acetate (EVA), thermoplastic polyurethane (TPU), an ionomer, a thermoplastic material, and/or combinations thereof. The non-photochromic glass material of inside glass pane 202 may be soda-lime glass, aluminosilicate glass, or borosilicate glass. In this embodiment, the laminate structure may provide strength to a thinner (e.g., 3 mm) photochromic glass. Non-photochromic glass materials of the present disclosure may be soda-lime glass, aluminosilicate glass, borosilicate glass, and/or combinations thereof.

FIG. 10 illustrates another embodiment of window 100 where a low emissivity layer 210 is provided at interface 250, between the non-photochromic glass and photochromic glass laminate in pane 202. In another embodiment, low emissivity layer 210 could be provided in any area across the thickness of glass pane 202, including on surface 206. Low emissivity layer 210 at interface 250 may further assist as an insulting layer within pane 202 (for the photochromic glass from both inside and outside temperatures) as described above. In embodiments, one or both of surfaces 204, 206 of glass pane 202 may be formed from photochromic glass. One of surfaces 204, 206 may also be formed from non-photochromic glass, such as a soda-lime glass composition. Low emissivity layer 210 at interface 250 on glass pane 202 may be the same or different layer 110 on glass pane 102.

In one embodiment where surface 204 of pane 202 is formed from photochromic glass and surface 206 of pane 202 is formed from a non-photochromic (with interface 250 there between), low emissivity layer 210 provided at interface 250 could be different than that low emissivity layer 110. Specifically, layer 210 may be a UV blocking layer capable of selectively reflecting and/or absorbing UV wavelengths from inside the structure that may activate the photochromism (darkening) of photochromic glass formed as surface 204 of pane 202. The desire to filter UV light from inside the structure is illustrated in FIG. 10.

Figure 11:
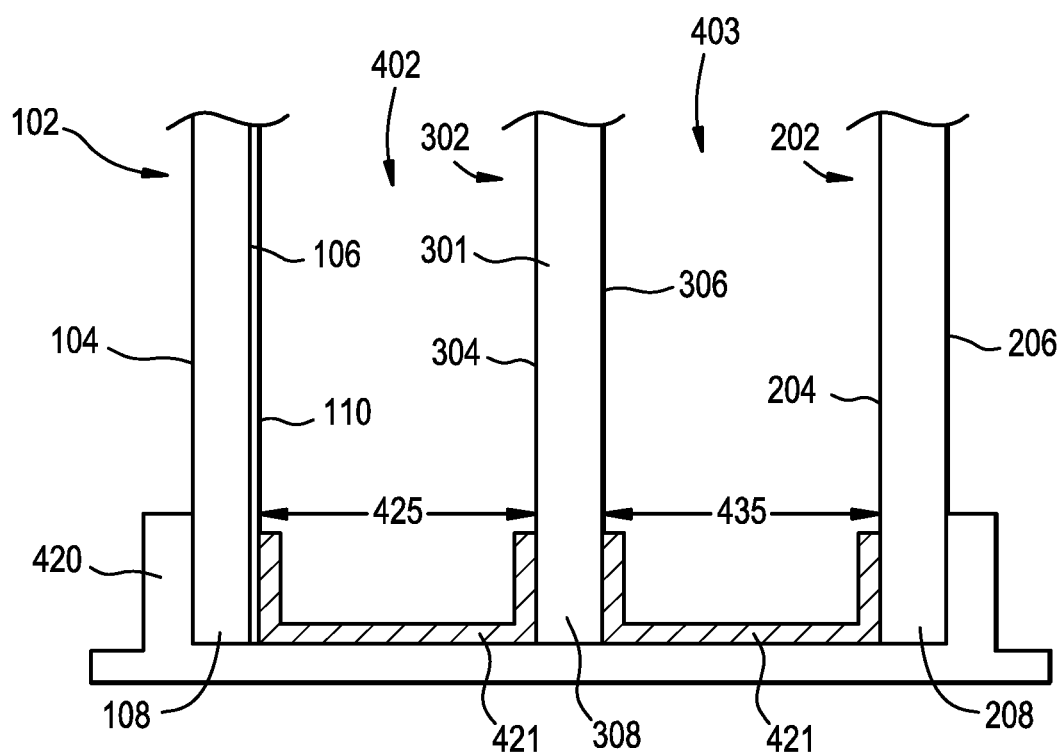
FIGS. 11-12 are cross-sectional views of the peripheral edge of a triple-pane window, drawn along line 1-1 of FIG. 1, according to exemplary embodiments.

In the FIG. 11 embodiment, a third glass pane 302 may be within space 401 between glass panes 102 and 202. In embodiments, glass pane 302 includes a body 301 with an outside surface 304 opposite an inside surface 306. Glass pane 302 may be in space 401 between panes 102, 202. In embodiments, a space 402 may exist between panes 102, 302 and a space 403 may exist between panes 302, 202. In embodiments, glass pane 302 is spaced apart from and disposed substantially parallel to glass panes 102, 202. Space 402 may be defined in part by a distance 425 between pane 102 and 302. Space 403 may be defined in part by a distance 435 between pane 302 and 202. Spaces 402, 403 may include a spacer 421. Distances 425, 435 may be the same or different than distance 400. One or both of spaces 402, 403 may be sealed and include an insulating gas like air, argon, krypton, and xenon. Alternatively, one or both of spaces 402, 403 may be sealed and include a pressure less than atmospheric pressure. In embodiments, outside surface 304 of pane 302 is adjacent space 402 between panes 102, 302. In embodiments, inside surface 306 is adjacent space 403 between panes 302, 202. In embodiments, glass pane 302 also includes at least one outer edge 308. Glass pane 302 may include additional surfaces and/or edges. Glass pane 302 may be formed from soda-lime glass, aluminosilicate glass, borosilicate glass, and/or combinations thereof.

Glass pane 302 may also include a low emissivity layer (not shown in FIGS. 11 and 12). Low emissivity layer 310 may be on surface 304, on surface 306, and/or at a location there between. Low emissivity layer 310 may be the same as or different from low emissivity layer 110, 210. Glass pane 302 may also be formed from photochromic glass compositions. Glass pane 302 may also be formed from a non-photochromic glass and a photochromic glass as laminate with an interface there between. That is, one surface of glass pane 302 is formed from non-photochromic glass and the opposite surface is formed from photochromic glass. In another embodiment of window 100, low emissivity layer 310 is provided at the interface, between the non-photochromic glass and photochromic glass laminate in pane 302. In another embodiment, low emissivity layer could be provided in any area across the thickness of glass pane 302. Of course, the interface of a laminated glass pane 302 may include a bonding interlayer.

Glass pane 302 in window 100 may help to further insulate photochromic glass of glass pane 202 from the outside ambient temperatures. Alternatively, glass pane 302 may include photochromic glass, non-photochromic glass, and/or a low emissivity composition, each independent or any combination of the three as a laminate. In the FIG. 12 embodiment, pane 202 is a laminate of a photochromic glass, a soda-lime glass, and a low emissivity layer. The photochromic glass forms surface 204 and the soda-lime glass forms surface 206 with low emissivity layer 210 thereon. This embodiment may provide a window solution for particularly hot and/or cold climates. Accordingly, photochromic glass forming surface 204 is insulated from outside temperatures by glass panes 108, 308, low emissivity layer 110, and spaces 402, 403. For cold climates, low emissivity layer 210 may reflect inside heat back inside or may act as a UV blocking layer capable of selectively reflecting and/or absorbing UV wavelengths from inside the structure.

As is noted above, low emissivity layers utilized in accordance with the concepts of the present disclosure may absorb a portion of the infrared (IR) and near infrared (NIR) wavelengths from the solar electromagnetic spectrum and, as such, may become heated upon exposure. In the embodiments illustrated in FIGS. 8, 9, 10, 11 and 12, and in other window assemblies constructed according to the concepts of the present disclosure, where a low emissivity layer 110 is provided on a glass pane in one of the thermally insulating spaces 401, 402, 403 between respective photochromic and non-photochromic glass panes, the low emissivity layer is only provided on the glass pane that is non-photochromic. In this manner, the photochromic glass pane will be thermally insulated from the low emissivity layer by the evacuated space between the panes, or by the thermally insulating gas provided there between, and will not be subject to any undue performance degradation that might otherwise be attributable to heating of the photochromic material by direct thermal contact with the low emissivity layer. In exemplary embodiments, the photochromic glass of the inside pane is insulated from temperatures below 15° C. and above 26° C.

In embodiments, any one or combination of glass panes 102, 202, 302 (or layers therein) may include a thermally strengthened glass layer, a chemically strengthened glass layer, a mechanically strengthened glass layer, a thermally and chemically strengthened glass layer, a thermally and mechanically strengthened glass layer or a chemically and mechanically strengthened glass layer. In embodiments, the photochromic glass is thermally strengthened glass, or chemically strengthened glass, or mechanically strengthened glass, or thermally and chemically strengthened glass, or thermally and mechanically strengthened glass, or chemically and mechanically strengthened glass. In an embodiment where the photochromic glass of internal glass pane 202 is laminated to a non-photochromic glass, the non-photochromic glass may be thermally strengthened glass, or chemically strengthened glass, or mechanically strengthened glass, or thermally and chemically strengthened glass, or thermally and mechanically strengthened glass, or chemically and mechanically strengthened glass. Of course, the photochromic glass and non-photochromic glass may be different combinations of the above strengthening techniques to create the same or different strength profiles on opposite sides of the interface.

According to one embodiment of the present disclosure, a window is provided comprising an outside glass pane and an inside glass pane. In embodiments, the outside glass pane includes a low emissivity layer. In embodiments, the inside glass pane comprises a photochromic glass and is spaced apart from and disposed substantially parallel to the outside glass pane. In embodiments, the outside glass pane transmits light in the visible portion of the optical spectrum and its low emissivity layer comprises an infrared blocking threshold where the low emissivity layer blocks transmission of a significant portion of solar radiation in the IR and near-IR bands. In embodiments, the low emissivity layer of the outside glass pane further comprises a photochromic activation threshold where the low emissivity layer transmits enough solar radiation in an activation band of the photochromic glass to enable solar radiation transmitted by the low emissivity layer of the outside glass pane in the direction of the inside glass pane to darken the photochromic glass and reduce visible light transmittance through the photochromic glass.

According to another embodiment of the present disclosure, the inside glass pane comprises an additional low emissivity layer such that the low emissivity layer of the outside glass pane and the additional low emissivity layer of the inside glass pane are positioned on opposite sides of the photochromic layer of the inside glass pane. In embodiments, the respective low emissivity layers comprise substantially different transmission characteristics within the activation band $\alpha$ of the photochromic glass, such that the low emissivity layer of the outside glass pane transmits a relatively high degree of solar radiation in the activation band $\alpha$ of the photochromic glass, while the additional low emissivity layer of the inside glass pane transmits a relatively low degree of radiation in the activation band $\alpha$ of the photochromic glass.

According to another embodiment of the present disclosure, the low emissivity layer of the outside glass pane absorbs solar radiation in the IR and near-IR bands and is provided in the thermally insulating space such that it is thermally insulated from the photochromic glass by the thermally insulating space.

According to another embodiment of the present disclosure, the low emissivity layer of the outside glass pane absorbs solar radiation in the IR and near-IR bands and is provided on the outside glass pane as the only low emissivity layer in the thermally insulating space.

According to another embodiment of the present disclosure, the photochromic glass of the inside glass pane is in direct thermal communication with the thermally insulating space between the inside and outside glass panes and is thermally insulated from the low emissivity layer by the thermally insulating space.

According to another embodiment of the present disclosure, a window comprising an outside glass pane and an inside glass pane is disclosed. In embodiments, the outside glass pane for interaction with outdoors comprises opposite surfaces and an outer edge and is formed from a first glass including a low emissivity layer. In embodiments, outside glass pane reflects light having a wavelength from about 701 nm to about 2,000 nm and transmits light having a wavelength from about 350 nm to about 700 nm. In embodiments, the inside glass pane for interaction with indoors comprises opposite surfaces and an outer edge and a photochromic glass. In embodiments, the inside glass pane is spaced apart from and disposed substantially parallel to the outside glass pane by a distance. In embodiments, light having a wavelength from about 350 to about 700 nm transmitted by the outside glass pane contacts the inside glass pane and darkens the photochromic glass.

According to another embodiment of the present disclosure, a window comprising an outside glass pane and an inside glass pane is disclosed. In embodiments, the outside glass pane for interaction with outdoors comprises opposite surfaces and an outer edge and is formed from a first glass. In embodiments, inside glass pane for interaction with indoors comprises opposite surfaces and an outer edge and a photochromic glass with a low emissivity layer. In embodiments, the inside glass pane is spaced apart from and disposed substantially parallel to the outside glass pane by a distance. In embodiments, the low emissivity layer reflects light having a wavelength from about 701 nm to about 2,000 nm and transmits light having a wavelength from about 350 nm to about 700 nm. In embodiments, light having a wavelength from about 350 to about 700 nm transmitted by the low emissivity layer contacts the inside glass pane and darkens the photochromic glass.

According to yet another embodiment of the present disclosure, a multi-pane window for a building is disclosed. In embodiments, the window comprises an outside glass pane adjacent the building exterior and an inside glass pane adjacent the building interior. In embodiments, the outside glass pane comprises first and second opposite surfaces and an outer edge and is formed from a first glass including a low emissivity layer. In embodiments, the outside glass pane reflects light from the building exterior having a wavelength from about 701 nm to about 2,000 nm and transmits light from the building exterior having a wavelength from about 350 nm to about 700 nm. In embodiments, the inside glass pane comprises first and second opposite surfaces and an outer edge and a photochromic glass as a laminate on a second glass. In embodiments, the inside glass pane is spaced apart from and disposed substantially parallel to the outside glass pane by a distance. In embodiments, light having a wavelength from about 350 to about 700 nm transmitted by the outside glass pane contacts the inside glass pane and darkens the photochromic glass.

According to another embodiment of the present disclosure, a building including a multi-pane window installed between and interior and exterior of the building is disclosed. In embodiments, the outside glass pane adjacent the building exterior comprises opposite surfaces and an outer edge and is formed from a first glass including a low emissivity layer. In embodiments, the outside glass pane reflects light from the building exterior having a wavelength from about 701 nm to about 2,000 nm and transmits light from the building exterior having a wavelength from about 350 nm to about 700 nm. In embodiments, the inside glass pane adjacent the building interior comprises opposite surfaces and an outer edge and a photochromic glass. In embodiments, the inside glass pane is spaced apart from and disposed substantially parallel to the outside glass pane by a distance. In embodiments, light having a wavelength from about 350 to about 700 nm transmitted by the outside glass pane contacts the inside glass pane and darkens the photochromic glass.

Methods of making window 100 are also disclosed herein. Methods of making window 100 include positioning outside glass pane 102 relative to inside glass pane 202 within a frame 420. In embodiments, frame 420 includes an overhanging edge portion configured to interfere with a portion of an edge of an opening in a building or enclosure and such that window 100 cannot be installed in the building or enclosure when outside glass pane 102 is adjacent the building interior.

Methods of installing window 100 are also disclosed herein. Methods of installing window 100 include arranging outside glass pane 102 relative to inside glass pane 202 in frame 420 such that outside glass pane 202 is adjacent an outdoor environment or building exterior and inside glass pane 102 is adjacent an indoor environment or building interior. Methods of installing window 100 may include positioning the outside glass pane adjacent to a building or enclosure exterior and the inside glass pane adjacent to a building or enclosure interior. Methods of installing window 100 may also include sealing window 100 within an opening of a building or enclosure. Methods of installing window may also include fixing inside glass pane and outside glass pane within frame 420.

As used herein, the singular forms "a," "an," and "the" include plural referents unless the context clearly dictates otherwise. Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of this disclosure may occur to persons skilled in the art, the present disclosure should be construed to include everything within the scope of the appended claims and their equivalents.

The invention claimed is:

1. A photochromic glass, comprising:
   (i) a glass matrix that, comprising in mol percent (mol %) based on oxides:
   66 mol %≤$SiO_2$≤75 mol %;
   8 mol %≤$B_2O_3$≤13 mol %;
   3.5 mol %≤$Al_2O_3$≤7 mol %;
   1.5 mol %≤$P_2O_5$≤6 mol %,
   3.6 mol %≤$Na_2O$≤5.5 mol %;
   3 mol %≤$K_2O$≤9.5 mol %;
   0 mol %≤MgO≤4 mol %;
   0 mol %≤$Li_2O$≤0.05 mol %; 0 mol %≤BaO≤0.05 mol %; 0 mol %≤CaO ≤0.05 mole %; wherein the amount of ($Li_2O$+BaO+CaO≤0.1 mole %);
   and
   (ii) a plurality of photochromic agents, comprising in mol percent (%) with respect to the glass matrix:
   0.07%≤Ag≤0.15%;
   0.14%≤Cl≤0.25%;
   0.025%≤Br≤0.04%;
   0.0065%≤CuO≤0.015%, and
   wherein CuO/Ag≤0.22.

2. The photochromic glass of claim 1, wherein 1.8 mol %≤$P_2O_5$≤4 mol %.

3. The photochromic glass of claim 1, wherein the glass matrix is free of rare earth elements.

4. The photochromic glass of claim 1, comprising no $Li_2O$, CaO, or BaO.

5. The photochromic glass of claim 1, wherein the glass matrix is free of rare earth elements, the glass comprising no $Li_2O$, CaO, or BaO.

6. The photochromic glass of claim 1, said glass further comprising a reducing agent for the photochromic agents.

7. The photochromic glass of claim 1, wherein the photochromic glass is at free of $TiO_2$.

8. The photochromic glass of claim 1, wherein the photochromic glass exhibits at least one of the following properties:
   (i) a transmission in the clear state $T_0$>85%;
   (ii) transmission in the darkened state after an 8-minute exposure at 22° C. ($T_{d8-22C}$)<35%;
   (iii) transmission in the darkened state after a 15-minute exposure at 35° C. ($T_{d15-35C}$)<45%; or
   (iv) fast fading characterized by a transmission $T_{f5}$ (minutes after UV extinction) >45%.

9. The photochromic glass of claim 1, wherein the glass has a heat treatment temperature $T_h$, and a softening point Ts, such that the difference between Ts−Th>50° C.

10. The photochromic glass of claim 9, wherein Ts−Th >65° C.

11. The photochromic glass of claim 9, wherein 150° C.>Ts−Th >65° C.

12. A window comprising the photochromic glass of claim 1.

13. A lens, comprising the photochromic glass of claim 1.

14. A photochromic glass, comprising:
   a glass matrix that is free of rare earth elements, and of $Li_2O$, CaO, and BaO, the glass matrix comprising of in mol percent (mol %) based on oxides:
   66 mol %≤$SiO_2$≤75 mol %;
   8 mol %≤$B_2O_3$≤13 mol %;
   3.5 mol %≤$Al_2O_3$≤7 mol %;
   1.5 mol %≤$P_2O_5$≤6 mol %,
   3.6 mol %≤$Na_2O$≤5.5 mol %;
   3 mol %≤$K_2O$≤9.5 mol %;
   0 mol %≤MgO≤4 mol %; and
   a plurality of photochromic agents, comprising in mol percent (%) with respect to the glass matrix:
   0.07%≤Ag≤0.15%;
   0.14%≤Cl≤0.25%;
   0.025%≤Br≤0.04%; and
   0.0065%≤CuO≤0.015%,
   wherein CuO/Ag≤0.18.

15. A window comprising:
   an outside glass pane comprising opposite surfaces and a first outer edge, the outside glass pane formed from a first glass and includes a low emissivity layer; and
   an inside glass pane comprising opposite surfaces and a second outer edge, the inside glass pane comprising a photochromic glass of claim 1,
   the inside glass pane is spaced apart from and disposed adjacent to the outside glass pane,
   the outside glass pane transmits light in the visible portion of the optical spectrum,
   the low emissivity layer blocks transmission of a portion of solar radiation in the IR and near-IR bands, and
   wherein the low emissivity layer of the outside glass pane transmits at least some light in an activation band of the photochromic glass while reducing visible light transmittance through the photochromic glass.

16. The window of claim 15 wherein: (i) a photochromic activation threshold of the low emissivity layer and the activation band of the photochromic glass are such that the inside glass pane darkens under indirect sunlight in less than about 7 minutes; (ii) or the low emissivity layer blocks a portion of solar radiation at wavelengths above about 700 nm.

17. The window of claim 15 wherein a photochromic activation threshold of the low emissivity layer and the activation band of the photochromic glass are such that the photochromic glass darkens from about 1 second to about 7 minutes.

18. The window according to claim 15, wherein:
   (I) the activation band α of the photochromic glass extends from about 350 nm to about 420 nm; and the low emissivity layer transmits the solar radiation in the activation band of the photochromic glass at wavelengths from about 350 nm to about 420 nm; or
   (II) the activation band α of the photochromic glass includes wavelengths from about 350 nm to about 420 nm; and the low emissivity layer is at least about 30% transmissive in at least one wavelength within the activation band α of the photochromic glass.

19. The window according to claim 18, wherein the low emissivity layer is at least about 50% transmissive to at least one wavelength situated in the activation band of the photochromic glass.

20. The window according to claim 15, wherein:
   the inside glass pane is spaced apart from and disposed to the outside glass pane to define a thermally insulating space there between;
   the thermally insulating space is either partially or fully evacuated, filled with a thermally insulating gas, or a combination thereof; and
   the low emissivity layer of the outside glass pane absorbs solar radiation in the IR and near-IR bands and is provided in the thermally insulating space such that it is thermally insulated from the photochromic glass by the thermally insulating space.

21. The window of claim 15 wherein:
the inside glass pane is spaced apart from and disposed adjacent to the outside glass pane to define a thermally insulating space there between; and
the low emissivity layer of the outside glass pane absorbs solar radiation in the IR and near-IR bands and is provided on the outside glass pane as the only low emissivity layer in the thermally insulating space.

22. The window as claimed in claim 15, wherein:
the inside glass pane is spaced apart from and disposed adjacent to the outside glass pane to define a thermally insulating space there between;
the low emissivity layer of the outside glass pane absorbs solar radiation in the IR and near-IR bands and is provided on the outside glass pane in the thermally insulating space; and
the photochromic glass of the inside glass pane is in direct thermal communication with the thermally insulating space between the inside and outside glass panes and is thermally insulated from the low emissivity layer by the thermally insulating space.

23. The window of claim 15 wherein:
the inside glass pane comprises an additional low emissivity layer such that the low emissivity layer of the outside glass pane and the additional low emissivity layer of the inside glass pane are positioned on opposite sides of the photochromic layer of the inside glass pane; and
the respective low emissivity layers comprise different transmission characteristics as a function of wavelength.

24. The window of claim 23 wherein the additional low emissivity layer is selected to minimize transmittance of wavelengths within the activation band α of the photochromic glass.

25. The according to claim 15, wherein: (i) the low emissivity layer is a coating on one of the outside glass pane opposite surfaces, the coating having a thickness from about 50 nm to about 250 nm; and/or (ii) wherein a first distance between the outside and inside glass panes is from about 5 mm to about 25 mm.

26. The window according to claim 15, wherein the inside glass pane further comprises a second glass as a laminate on the photochromic glass with an interface there between, wherein one surface of the inside glass pane is formed from the photochromic glass and the opposite surface of the inside glass pane is formed from the second glass.

27. The window as claimed in claim 26, further comprising a bonding interlayer at the laminate interface, wherein the boding interlayer is transparent to visible light.

28. The window as claimed in claim 27 wherein the bonding interlayer comprises polyvinyl butyral (PVB), polycarbonate, acoustic PVB, ethylene vinyl acetate (EVA), thermoplastic polyurethane (TPU), an ionomer, a thermoplastic material, or combinations thereof.

29. The window of claim 26 further comprising an additional low emissivity layer at the interface between the photochromic glass and the second glass.

30. The window as claimed in claim 29 wherein the additional low emissivity layer is selected to minimize transmittance of wavelengths within the activation band α of the photochromic glass.

31. The window of claim 15 further comprising a third glass pane,
wherein the third glass pane is spaced apart from and disposed adjacent to the outside glass pane by a second distance, and
wherein the third glass pane is spaced apart from and disposed adjacent to the inside glass pane by a third distance.

32. A method of installing the window of claim 15 in an opening of an enclosure comprising:
positioning the outside glass pane adjacent to an enclosure exterior and the inside glass pane adjacent to an enclosure interior.

33. The method of claim 32 further comprising sealing the window within the opening of the enclosure.

* * * * *